US012561145B1

(12) United States Patent (10) Patent No.: US 12,561,145 B1

Eyole et al. (45) Date of Patent: Feb. 24, 2026

(54) LOW-PRECISION COMPUTATION

(71) Applicant: Arm Limited, Cambridge (GB)

(72) Inventors: Mbou Eyole, Cambridge (GB);
Mariam Rakka, Irvine, CA (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/903,484

(22) Filed: Oct. 1, 2024

(51) Int. Cl.
G06F 9/30 (2018.01)
G06F 9/38 (2018.01)

(52) U.S. Cl.
CPC ........ G06F 9/3877 (2013.01); G06F 9/30014 (2013.01); G06F 9/30145 (2013.01); G06F 9/3867 (2013.01)

(58) Field of Classification Search
CPC ............... G06F 9/3877; G06F 9/30014; G06F 9/30145; G06F 9/3867
See application file for complete search history.

(56) References Cited

U.S. PATENT DOCUMENTS

| | | | |
|---|---|---|---|
| 10,929,129 B2 * | 2/2021 | Ould-Ahmed-Vall | ....................... G06F 13/4027 |
| 12,073,251 B2 * | 8/2024 | Challapalle | ........... G06F 9/4843 |
| 2019/0310854 A1 | 10/2019 | Bainville et al. | |
| 2020/0410038 A1 * | 12/2020 | Dasgupta | .............. G06F 9/3818 |
| 2022/0269931 A1 | 8/2022 | Mellempudi et al. | |

| | | | |
|---|---|---|---|
| 2023/0095072 A1 | 3/2023 | Chachick et al. | |
| 2023/0333857 A1 * | 10/2023 | Langhammer | ...... G06F 9/30043 |
| 2024/0354107 A1 * | 10/2024 | Hady | .................. G06F 9/30047 |

OTHER PUBLICATIONS

Robert Bedichek, "Some Efficient Architecture Simulation Techniques", Department of Computer Science, FR-35, 12 pages.
International Search Report and Written Opinion of the International Searching Authority for PCT/GB2025/051843 mailed Dec. 4, 2025, 16 pages.

* cited by examiner

*Primary Examiner* — Corey S Faherty

(74) *Attorney, Agent, or Firm* — NIXON & VANDERHYE P.C.

(57) ABSTRACT

An apparatus comprises decoding circuitry configured to decode instructions; processing circuitry configured to perform data processing operations in response to the instructions decoded by the decoding circuitry; extension processing circuitry configured to perform a low-precision computation extension task asynchronously with respect to other data processing operations performed by the processing circuitry, the low-precision computation extension task comprising processing one or more sets of data elements for which at least one of the sets of data elements comprises low-precision data represented in a low-precision number format with lower precision than a single-precision floating-point format; and an extension task offload interface separate from an interface by which the processing circuitry issues a memory system request to a memory system, wherein the extension task offload interface is responsive to at least one task offloading instruction decoded by the decoding circuitry to offload the low-precision computation extension task to the extension processing circuitry.

20 Claims, 17 Drawing Sheets

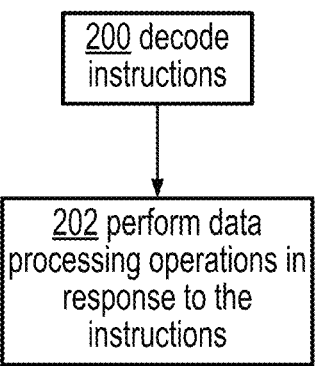

| 200 decode instructions |

| 202 perform data processing operations in response to the instructions |

FIG. 2

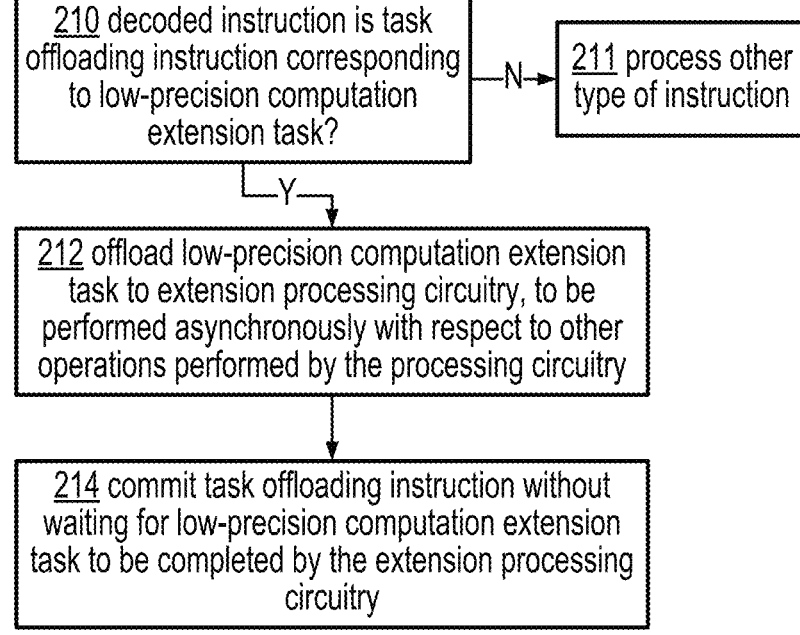

| 210 decoded instruction is task offloading instruction corresponding to low-precision computation extension task? | —N→ | 211 process other type of instruction |

└—Y—┐

212 offload low-precision computation extension task to extension processing circuitry, to be performed asynchronously with respect to other operations performed by the processing circuitry 214 commit task offloading instruction without waiting for low-precision computation extension task to be completed by the extension processing circuitry

FIG. 3

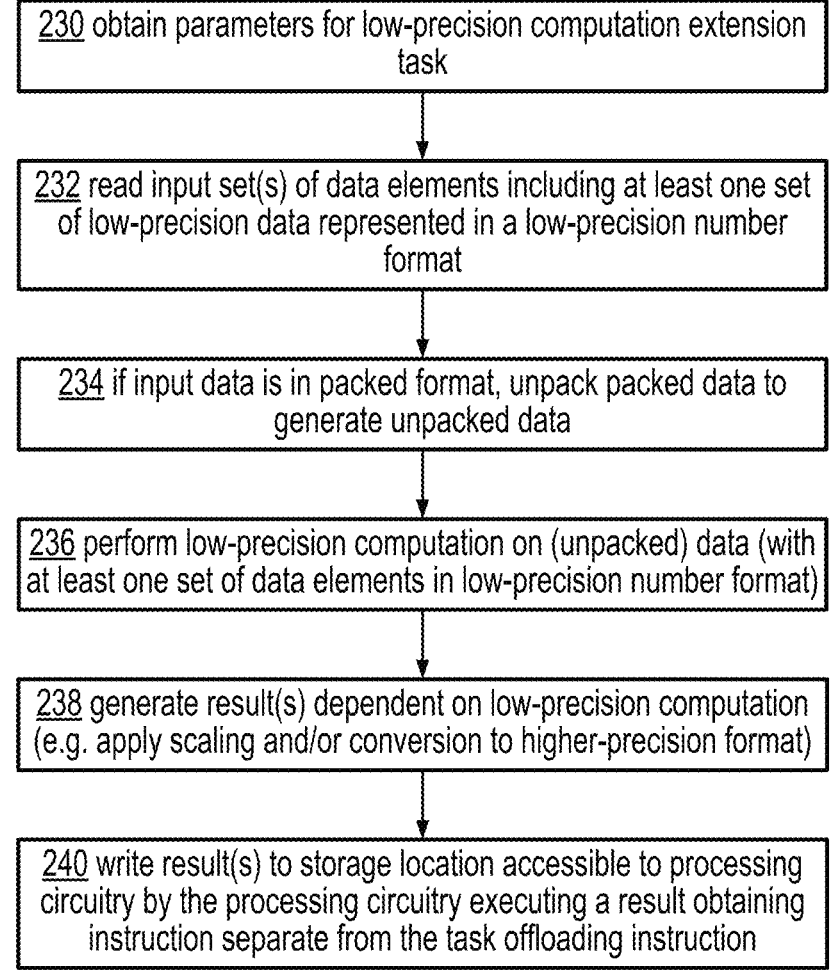

230 obtain parameters for low-precision computation extension task 232 read input set(s) of data elements including at least one set of low-precision data represented in a low-precision number format 234 if input data is in packed format, unpack packed data to generate unpacked data 236 perform low-precision computation on (unpacked) data (with at least one set of data elements in low-precision number format)

238 generate result(s) dependent on low-precision computation (e.g. apply scaling and/or conversion to higher-precision format)

240 write result(s) to storage location accessible to processing circuitry by the processing circuitry executing a result obtaining instruction separate from the task offloading instruction

FIG. 4 nb=128
(4096
weights/col)

1 col
has 16-bit
FP scale+
32 4-bit
interleaved
weights
(stored as
16 8-bit
uint)

LOW-PRECISION COMPUTATION

BACKGROUND

Technical Field

The present technique relates to the field of data processing.

Technical Background

A data processing apparatus may support various number formats for data processed by processing operations. Different number formats may represent numbers with different levels of precision (the number of bits used to represent the significant digits of the number). For a floating-point format, the precision may refer to the number of bits of the significand of the floating-point number (excluding bits of the floating-point number used to represent a sign bit or exponent). For an integer or fixed-point format, the precision may refer to the number of bits in the stored number as a whole.

SUMMARY

At least some examples of the present technique provide an apparatus comprising: decoding circuitry configured to decode instructions; processing circuitry configured to perform data processing operations in response to the instructions decoded by the decoding circuitry; extension processing circuitry configured to perform a low-precision computation extension task asynchronously with respect to other data processing operations performed by the processing circuitry, the low-precision computation extension task comprising processing one or more sets of data elements for which at least one of the sets of data elements comprises low-precision data represented in a low-precision number format with lower precision than a single-precision floating-point format; and an extension task offload interface separate from an interface by which the processing circuitry issues a memory system request to a memory system, wherein the extension task offload interface is responsive to at least one task offloading instruction decoded by the decoding circuitry to offload the low-precision computation extension task to the extension processing circuitry.

At least some examples of the present technique provide a system comprising: the apparatus described above, implemented in at least one packaged chip; at least one system component; and a board, wherein the at least one packaged chip and the at least one system component are assembled on the board.

At least some examples of the present technique provide a chip-containing product comprising the system described above, wherein the system is assembled on a further board with at least one other product component.

At least some examples of the present technique provide computer-readable code for fabrication of an apparatus as described above. The computer-readable code may be stored on a computer-readable storage medium. The computer-readable storage medium may be a non-transitory storage medium.

At least some examples of the present technique provide a computer program comprising instructions which, when executed by a host data processing apparatus, control the host data processing apparatus to provide an instruction execution environment for execution of target program code, the computer program comprising: decoding program logic configured to decode instructions of the target program code; processing program logic configured to control the host data processing apparatus to perform data processing operations in response to the instructions decoded by the decoding program logic; and extension processing program logic configured to simulate offloading, in response to at least one task offloading instruction decoded by the decoding program logic, a low-precision computation extension task to simulated asynchronous extension processing circuitry simulated as being accessible via an extension task offload interface separate from a simulated memory system access interface, the low-precision computation extension task comprising processing one or more sets of data elements for which at least one of the sets of data elements comprises low-precision data represented in a low-precision number format with lower precision than a single-precision floating-point format. The computer program may be stored on a computer-readable storage medium. The computer-readable storage medium may be a non-transitory storage medium.

At least some examples provide a method comprising: decoding instructions using decoding circuitry; and in response to the decoded instructions, performing data processing operations using processing circuitry; wherein the method comprises: in response to at least one task offloading instruction, offloading a low-precision computation extension task via an extension task offload interface to extension processing circuitry, where the extension task offload interface is separate from an interface by which the processing circuitry issues a memory system request to a memory system; and performing, using the extension processing circuitry, the low-precision computation extension task asynchronously with respect to other data processing operations performed by the processing circuitry, the low-precision computation extension task comprising processing one or more sets of data elements for which at least one of the sets of data elements comprises low-precision data represented in a low-precision number format with lower precision than a single-precision floating-point format.

Further aspects, features and advantages of the present technique will be apparent from the following description of examples, which is to be read in conjunction with the accompanying drawings.

BRIEF DESCRIPTION OF THE DRAWINGS

FIG. 2 illustrates a method of processing instructions;

FIG. 3 illustrates a method of offloading a low-precision computation extension task to extension processing circuitry;

FIG. 4 illustrates a method of processing the low-precision computation extension task using the extension processing circuitry;

DESCRIPTION OF EXAMPLES

Figure 1:
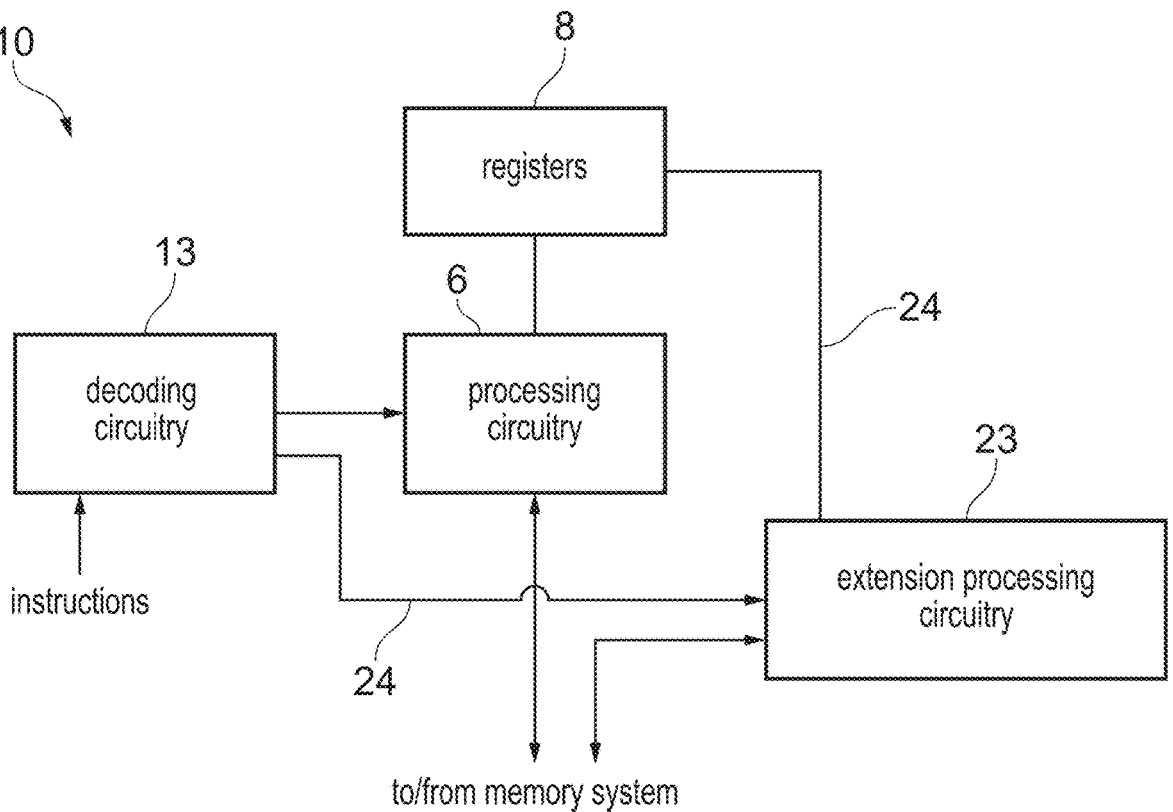
FIG. 1 illustrates an example of an apparatus comprising decoding circuitry, processing circuitry and extension processing circuitry.

Low-precision number formats, having lower precision than single-precision floating-point numbers, are becoming increasingly prevalent, especially for machine learning workloads such as large language models (LLMs). While traditionally single-precision or double-precision floating-point (or 32-bit or larger integer or fixed-point formats) have been the default data types for many software developers, in recent years the trend has been shifting downwards towards lower-precision formats, which can be packed more densely in memory and so help greatly reduce the memory footprint and bandwidth requirements for data-heavy workloads such as machine learning workloads. Reducing the memory storage and access overhead translates into energy savings and performance improvements compared to equivalent algorithms processed on data represented in higher-precision number formats.

In the examples discussed below, an apparatus comprises decoding circuitry configured to decode instructions; processing circuitry configured to perform data processing operations in response to the instructions decoded by the decoding circuitry; and extension processing circuitry configured to perform a low-precision computation extension task asynchronously with respect to other data processing operations performed by the processing circuitry. The low-precision computation extension task comprises processing one or more sets of data elements for which at least one of the sets of data elements comprises low-precision data represented in a low-precision number format with lower precision than a single-precision floating-point format. The low-precision computation extension task is offloaded to the extension processing circuitry in response to at least one task offloading instruction decoded by the decoding circuitry, with the offload being performed via an extension task offload interface which is separate from an interface by which the processing circuitry issues a memory system request (e.g. coherence transaction) to a memory system.

This approach can provide acceleration opportunities for accelerating workloads involving low-precision computations (such as computations which are common in LLM kernels), as the extension processing circuitry can free up the processing circuitry to perform other operations while the low-precision computation extension task is being performed. However, unlike alternative techniques for accelerating such computations, the low-precision computation extension task is performed asynchronously using extension processing circuitry accessible via an interface separate from the memory system interface used by the processing circuitry. This means the extension processing circuitry can be integrated more closely with the processing circuitry than with alternative acceleration techniques using a remote accelerator, graphics processing unit (GPU) or neural processor which is configurable based on the processing circuitry issuing memory store operations to write control data to shared control data structures stored in the memory system. By providing a configuration interface separate from the load/store mechanism used to access memory, the configuration overhead of configuring the low-precision computation on the extension processing circuitry can be reduced, which opens up opportunities for acceleration on shorter computation tasks for which the high performance cost of configuring memory-based control structures used by a remote accelerator would be prohibitive. On the other hand, compared to use of a coprocessor which processes a stream of instructions offloaded by the processing circuitry synchronously, the asynchronous extension processing circuitry can be implemented with reduced circuit area and power cost as there is less need for circuit logic to be expended on result buses, forwarding and hazarding circuit logic, issue queue structures, physical register file read/write ports, etc. which would be used for controlling interaction between respective instructions executed synchronously. With asynchronous processing logic, a dedicated hardware pipeline can be constructed with less need for intermediate results of processing to be accessible by any particular software instruction, reducing the circuit area and power costs of implementing the extension processing circuitry.

The inventors recognised that low-precision computations offer a particularly attractive opportunity for acceleration using the extension processing circuitry, when compared with higher-precision computations, because the circuit area and power cost of implementing the extension processing circuitry (which may require additional circuit logic beyond the circuit logic already provided in the processing circuitry) can be lower when implementing reduced-precision computations, since storage elements, signalling paths, and compute logic such as multipliers and adders can be based on narrower bitwidths. Also, given the recent trend towards lower-precision implementation of LLM kernels and other machine learning workloads, the likelihood of such extension processing circuitry supporting low-precision computation being used across a range of workloads is high. Hence, asynchronous extension processing circuitry accessible by the processing circuitry via an offload interface separate from the memory system interface, which supports low-precision computation extension tasks operating on one or more sets of data elements, at least one of which is in a low-precision number format, can provide a particularly attractive balance of performance speed up relative to the incurred circuit area/power cost of implementing the extension processing circuitry. For processor implementations with limited circuit area and power budget, such extension processing circuitry can therefore greatly reduce the practical barriers to introducing mechanisms for accelerating machine learning workloads being performed by a central processing unit (CPU) or other processor.

The low-precision computation extension task that is offloaded to the extension processing circuitry can include any computations based on low-precision data represented in a low-precision number format with less precision (fewer bits representing the significant digits of the represented number) than single-precision floating-point (also referred to as SP floating-point or FP32).

However, the estimated performance uplift-to-circuit area ratio can be particularly beneficial for low-precision computation extension tasks comprising a dot product operation or outer product operation. A dot product operation (also known as inner product operation) comprises determining a sum of products of respective pairs of elements from first and second sets of data elements, at least one of the first and second sets of data elements comprising the low-precision data. An outer product operation comprises determining a two-dimensional array of result elements from first and second sets of data elements comprising the low-precision data (the first and second sets of data elements representing one-dimensional vectors), each result element depending on a product of a respective pair of elements selected from the first and second sets of data elements (optionally with the product of the pair of elements being added to a corresponding accumulator element selected from a two-dimensional array of accumulator elements to generate the result element). Such dot product operations (which can also be referred to as inner product operations) and outer product operations form the backbone of matrix multiplication operations used in many kernel functions used in LLMs and other machine learning workloads, and when operating on low-precision data can be implemented with relatively low-overhead circuit logic. Hence, providing an asynchronous extension unit to accelerate dot product or outer product operations on low-precision input data can be particularly attractive.

Hence, in some examples, for at least one variant of the low-precision computation extension task supported by the extension processing circuitry, the low-precision computation extension task comprises a dot product operation to determine a sum of products of respective pairs of elements from first and second sets of data elements, at least one of the first and second sets of data elements comprising the low-precision data.

In some examples, for at least one variant of the low-precision computation extension task supported by the extension processing circuitry, the low-precision computation extension task comprises an outer product operation to determine a two-dimensional array of result elements from first and second sets of data elements comprising the low-precision data, each result element depending on a product of a respective pair of elements selected from the first and second sets of data elements.

Some implementations may only support one of these variants of a low-precision computation extension task, supporting either a dot product variant or an outer product variant. Other implementations may support both a dot product variant and an outer product variant of the low-precision computation extension task. Other examples may support neither dot product nor outer product in the low-precision computation extension task, but could implement a different arithmetic operation for the low-precision computation extension task.

In some examples, both the first and second sets of data elements combined in the dot product operation or the outer product operation can comprise low-precision data in a low-precision number format. The low-precision number format used for the first set of data elements can be the same as, or different to, the low-precision number format used for the second set of data elements. For example, some machine learning kernels may perform inner/outer product operations on mixed-precision data, e.g. combining 4-bit and 8-bit data sets, or 8-bit and 16-bit data sets, say.

A maximum precision supported by the extension processing circuitry for a given arithmetic operation of the low-precision extension task may be less precise than a maximum precision supported for the given arithmetic operation performed by the processing circuitry. Hence, while both the processing circuitry (using one or more instructions processed synchronously) and the extension processing circuitry (using hardware which performs the extension task asynchronously) may support a particular arithmetic operation (such as a dot product or outer product) operation), the processing circuitry may support that arithmetic operation across a wider range of number formats than the extension processing circuitry. The extension processing circuitry may be more restricted than the processing circuitry in the range of precisions supported (with the extension processing circuitry focusing on one or more lower-precision number formats).

The low-precision computation extension task may in some examples comprise one or more additional steps, in addition to a main low-precision computation step such as an arithmetic operation (e.g. the dot product operation or outer product operation described above). Such additional steps could comprise a pre-processing step for pre-processing input data read from memory to generate the data to be processed in the main low-precision computation, or could comprise a post-processing step to apply further operations to the result generated in the main low-precision computation.

For example, the low-precision computation extension task may comprise unpacking a packed set of data elements represented in the low-precision number format, to generate an unpacked set of data elements. For example, some algorithms may operate on packed data stored in memory in an interleaved format, where multiple independent streams of data are interleaved in the stored data in memory, and the low-precision computation extension task may comprise unpacking one or more of those interleaved streams to generate a contiguous stream of data for subsequent processing (that subsequent processing step could be part of the low-precision computation extension task itself or could be outside the scope of the low-precision computation extension task—e.g. in some examples a low-precision computation extension task could merely comprise the unpacking operation without any subsequent arithmetic operation being performed on the unpacked data).

In some examples, the low-precision computation extension task comprises a scaling operation comprising scaling, based on a scaling factor, at least one value dependent on said at least one set of data elements represented in the low-precision number format, to generate at least one scaled value. For example, the scaling operation may adjust the magnitude of a given number by multiplying it by a value represented by the scaling factor. Some machine learning kernel functions may compress stored data, while supporting a nominal increased range for the data, by storing a set of lower-precision data in association with a scaling factor which can be multiplied with the lower-precision data itself or with values derived from the lower-precision data, to generate the actual numeric values represented by that data. The scaling factor can be shared between multiple data elements, so use of scaling can reduce the memory footprint required to support a given number range compared to each data element being represented in a higher-precision format (at the expense of a reduction in precision). Hence, some workloads may involve rescaling one or more values dependent on the low-precision data (e.g. applying the rescaling to the result of a low-precision computation performed on the low-precision data). By offloading such a rescaling operation to the extension processing circuitry, this frees up opportunities for the processing circuitry to perform other operations. The rescaling operation can be implemented relatively efficiently with limited additional processing circuit logic in the extension processing circuitry.

Another example of an operation performed within the low-precision computation extension task can be a format conversion operation to generate at least one converted value by converting, to a higher-precision number format having higher precision than said low-precision number format, at least one value dependent on said at least one set of data elements represented in the low-precision number format. For example, a result of the low-precision computation (e.g. dot product or outer product result) may be converted into a higher-precision number format for subsequent processing. For example, the higher-precision number format could be any of: the single-precision floating-point format (FP32 or float32); half-precision floating-point format (HP floating-point, also referred to as FP16 or float16); bfloat16 floating-point format (an alternative 16-bit floating-point format with 8-bit significand precision rather than 11-bit precision as in FP16 (the precision of bfloat16 and FP16 being considered to include the implicit significant bit that is not part of the stored bfloat16 or FP16 number), or a 16-bit integer format. These are just some examples of possible formats which may, for some examples, be higher precision than the original low-precision format used for the input data to the low-precision computation (e.g. the low-precision format could involve 8-bit or lower precision). By implementing the conversion to higher-precision on the extension processing circuitry, this can further accelerate processing of machine learning workloads using low-precision computations, compared to cases where the extension processing circuitry generates lower precision results and the conversion to higher precision is carried out on the processing circuitry.

In some cases, the low-precision computation extension task may comprise writing the at least one converted value to a storage location accessible to the processing circuitry. The storage location could be a memory system location, or a memory-mapped register associated with the processing circuitry or the extension processing circuitry which the processing circuitry can read by issuing a load operation specifying an address mapped to the memory-mapped register, or a system register or other architecturally defined processor register which the processing circuitry can read by issuing a specific instruction instructing a register read for that register. As noted further below, in some cases the storage location may be a destination register of an extension task result synchronisation instruction.

In some examples the low-precision computation extension task may exclude any further higher-precision computation performed on the at least one converted value converted from the low-precision number format. Hence, in some cases, the low-precision extension task comprises low-precision computation and a conversion to a higher-precision value, but does not attempt to perform any subsequent higher-precision computation on the converted value. The processing of the converted value using higher-precision arithmetic may be left to be performed by the processing circuitry in response to synchronously processed instructions, rather than by the extension processing circuitry using asynchronous hardware processing circuit logic. By excluding higher-precision arithmetic from the offloaded extension task, the circuit area cost of the extension processing circuitry can be lower as there is no need to implement wider multipliers, adders, storage elements etc. within the extension processing circuitry. Hence, this can help support a relatively lightweight extension unit which, for a limited additional circuit area and power budget, can support acceleration of a wide range of machine learning workloads which make use of low-precision input data.

On the other hand, in other examples (e.g. in systems for which the system designer is willing to expend additional circuit area to achieve greater performance uplift), the low-precision computation extension task could also comprise performing a higher-precision computation operation on the at least one converted value represented in the higher-precision number format, to generate at least one result value to be written to a storage location accessible to the processing circuitry. By providing support for additional higher-precision computations to be offloaded to the asynchronous extension processing circuitry, this enables greater performance speed up as the processing circuitry can then perform other operations in parallel with the higher-precision computation on the extension processing circuitry.

Hence, it will be appreciated that there can be a trade-off between performance benefit and circuit area/power cost, with different system implementations choosing different trade-off points, so even for a particular data flow required for a given workload, there can be different points at which the boundary can be implemented between the end of the low-precision computation extension task (at the point when a result is written to a storage location accessible to the processing circuitry) and the portion of the data flow that is then carried out subsequently by the processing circuitry using synchronously processed instructions. For some use cases, that boundary may lie before any higher-precision arithmetic is required, and for other use cases, that boundary may be after at least one higher-precision arithmetic operation is performed. In both cases, however, by offloading at least the low-precision computation to the extension processing circuitry, a significant amount of acceleration at limited area budget can be provided, and it can then be a matter of design choice for the system designer whether or not to also implement more area-hungry higher-precision operations as part of the low-precision computation extension task.

The low-precision number format for the low-precision data can be any number format with less precision than single-precision floating-point. For single-precision floating-point, the number of significand bits is 24 (1 implicit bit and 23 bits represented explicitly in the stored number format). Hence, the low-precision data may have a precision of 23 bits or less. For example, low-precision number formats can include half-precision (HP) floating-point (FP16), bfloat16, an integer format, a scaled-integer format (for which the data elements are represented as integer values with relatively few bits, and an accompanying scaling factor shared between a group of integer values scales the numbers represented by each integer by a multiplicative factor), or a fixed-point format.

In some examples, the low-precision number format has a precision of 16 bits or less.

However, in some examples, the low-precision number format has a precision less than or equal to 8 bits. For example, the low-precision number format may be an integer format or fixed-point represented by 8 bits or fewer, or a floating-point format where the significand of the floating-point number is represented by 8 bits or fewer. LLM kernel functions operating on 8-bit elements or smaller are increasingly common, e.g. where the low-precision data elements represented quantized weights or activations for a neural network. By limiting the low-precision computation data-path widths to 8 bits or shorter for low-precision computation steps within the low-precision computation extension task, the circuit area and power cost of the extension processing circuitry can be kept low while nevertheless offering a significant performance speed up for operations which are relatively common within typical machine learn-ing kernel functions.

In some examples, the low-precision number format can be even lower than 8 bits, e.g. with precision represented using 7 bits or fewer; 6 bits or fewer; 5 bits or fewer; 4 bits or fewer; 3 bits or fewer; 2 bits or fewer; or in the extreme case with 1-bit precision. For example, machine learning kernels exist using 6-bit, 4-bit, or 2-bit quantized weights/ activations, say, which are typically combined with other low-precision data elements (either of the same precision or of mixed-precision) using dot product or outer product operations. Hence, such low-precision computations can be good candidates for acceleration using the extension pro-cessing circuitry.

In some examples, the extension processing circuitry is configured to pipeline processing of respective groups of sets of data elements when performing the low-precision computation extension task. The respective groups of sets of data elements could comprise groups corresponding to respective instances of low-precision computation extension task (offloaded in response to separate task offloading instructions) or could be groups of data being processed as part of the same instance of a low-precision computation extension task. By pipelining processing of respective groups of sets of data elements (such that a later step of the low-precision computation extension task is performed on a first group of one or more sets of data elements in parallel with an earlier step of the low-precision computation exten-sion task being performed on a second group of one or more sets of data elements), performance can be improved com-pared to back-to-back processing of each group sequentially.

The extension task offload interface can be implemented in different ways.

In some examples, the extension task offload interface may be entirely separate from the load/store path by which load/store memory system requests are sent to a memory system based on execution of load/store instructions by the processing circuitry.

For example, the task offloading instruction(s) may com-prise an instruction separate from a load/store instruction executed by the processing circuitry to cause a load/store memory system request to be issued to a cache or other memory storage device of a memory system. For example, a dedicated extension task offloading instruction type may be defined in the instruction set architecture supported by the decoding circuitry and processing circuitry, distinct from other instruction types which have uses not related to extension task offloading, such as load/store instructions or system register updating instructions.

For example, the task offloading instruction may comprise an extension task offloading instruction specifying an exten-sion operation identifier indicative of which of a plurality of extension tasks is to be performed by the extension process-ing circuitry, where for the task offloading instruction cor-responding to the low-precision computation extension task, the extension operation identifier has a value identifying that the offloaded extension task is the low-precision computa-tion extension task (or if multiple variants of the low-precision computation extension task are supported, e.g.

corresponding to different LLM kernels and/or different low-precision number formats of input data), the extension operation identifier may distinguish which particular variant of the low-precision computation extension task is to be performed. The extension operation identifier may support encodings corresponding to a variety of different types of extension tasks that could be performed asynchronously. At least one encoding of the extension operation identifier may be allocated to correspond to a given variant of the low-precision computation extension task.

In some examples, the task offloading instruction may specify at least one register operand indicative of one or more parameters to be passed to the extension processing circuitry for controlling the low-precision computation extension task. For example, the at least one register operand may include an address operand indicative of a memory address of the low-precision data to be processed in the low-precision computation extension task. The at least one register operand could also include one or more parameters identifying the type of low-precision computation extension task to be performed, or other configuration options gov-erning how the low-precision computation extension task should be performed.

It will be appreciated that while the task offload mecha-nism uses a separate interface from the load/store memory system interface, this does not exclude further control infor-mation being passed from the processing circuitry to the extension processing circuitry via memory. For example, the extension processing circuitry, having been configured to start its extension task via the separate extension task offload interface, may subsequently read further control parameters from memory from a location identified by an address passed as a parameter via the extension task offload inter-face.

Another approach can be that the task offloading instruc-tion comprises an instruction which writes to a control register. For example, a set of control registers (e.g. system registers or memory-mapped registers) may be provided which are used as an interface for configuring the extension processing circuitry to perform an offloaded extension task. The control registers may include registers for defining parameters of the extension task (e.g. the address of the low-precision data to be processed by the low-precision computation extension task). The control registers may also include a launch register. In some examples, the task off-loading instruction could therefore be an instruction which writes to the launch register, triggering offloading of the extension task to the extension processing circuitry (with the extension processing circuitry also being passed any other control parameters which may have been written to other registers of the set of control registers prior to executing the instruction which writes to the launch register).

In the case where the task offloading instruction is an instruction which writes to a control register, the instruction type of the control register updating instruction could be a generic instruction type also used for other control register updates not related to extension task offload. For example, the task offloading instruction could be a system register updating instruction, or a store instruction specifying an address mapped to the launch register. The task offloading instruction may therefore be associated with a parameter that distinguishes whether a particular instance of the instruction represents the task offloading instruction or represents a register update instruction or memory access instruction not related to extension task offload. That parameter could be defined in different ways. In some examples, the parameter could be specified as an operand of the task offloading instruction, e.g. a register operand where the instruction references a selected register and the value stored in that register defines the parameter identifying whether the instruction is the task offloading instruction. Alternatively, the parameter may be stored in another control register other than the control register written by the task offloading instruction, where that parameter may have been written to that other control register by an earlier instruction than the task offloading instruction. For example, where the set of control registers includes the launch register and one or more parameter registers for defining parameters for controlling the offloaded extension task, the task offloading instruction may specify that the launch register should be updated, but the parameter distinguishing that the particular extension task to be offloaded is the low-precision computation extension task, say (or any other type of extension task supported by the extension processing circuitry), may be in one of the parameter registers and so may not itself be directly specified by the task offloading instruction. Nevertheless, even though the overall sequence of instructions for controlling the offload may involve a sequence of multiple instructions (one or more instructions to set the parameter registers, followed by the instruction writing to the launch register), the final instruction of the sequence which writes to the launch register can be regarded as a task offloading instruction which actually causes the low-precision computation extension task to be offloaded to the extension processing circuitry.

Hence, it will be appreciated that there are a variety of ways in which the extension task offload interface for controlling offload of extension tasks to the extension processing circuitry can be controlled using instructions decoded by the decoding circuitry.

In some examples, in response to the task offloading instruction or an extension task identifier obtaining instruction subsequent to the task offloading instruction, the processing circuitry is configured to obtain from the extension processing circuitry an extension task identifier used by the extension processing circuitry to identify a specific instance of an extension task initiated by task offloading instruction. The extension task identifier may be a "handle" assigned by the extension processing circuitry to a specific instance of an extension task (such as the low-precision computation extension task or other types of extension task), which may be used to differentiate multiple instances of extension tasks assigned to the extension processing circuitry. The extension task identifier may be referenced in subsequent instructions relating to a given instance of an extension task, e.g. for querying status of the extension processing circuitry or confirming completion of the given instance of the extension task or, in some examples, for obtaining a result of the extension task.

In some examples, the task offloading instruction itself may cause the extension task identifier to be returned to the processing circuitry (e.g. the extension task identifier could be written to a destination register of the task offloading instruction, from which it can be read as an input operand of a subsequent instruction). In other examples, the task offloading instruction may cause the extension processing circuitry to assign an extension task identifier to the specific instance of the extension task initiated by the task offloading instruction, but to obtain the extension task identifier to make it available for use as an operand of a subsequent instruction, a subsequent instruction (e.g. a system register read instruction or load instruction specifying an address mapped to a memory-mapped register providing the extension task identifier) may be executed by the processing circuitry to cause the extension task identifier to be read from a system location at which the extension processing circuitry stored in the extension task identifier, and transfer the extension task identifier to a destination register of the subsequent instruction. Hence, there can be different ways of implementing the architectural mechanism to allow the extension task identifier assigned by the extension processing circuitry to be made available to software processed by the processing circuitry.

In some examples, in response to an extension task status checking instruction associated with an extension task identifier indicative of a specific instance of an extension task offloaded to the extension processing circuitry, the processing circuitry is configured to obtain status information indicative of a current status of the extension task at the extension processing circuitry. For example, the status information may support encodings corresponding to any two or more of the following list:

an in-progress state indicating that the extension processing circuitry has not yet completed the extension task;

a completed state indicating that the extension processing circuitry has completed the extension task;

an interrupted state indicating that the extension processing circuitry was interrupted while performing the extension task;

a failed state indicating that an error occurred while performing the extension task.

Such status indications can be used by the software thread which offloaded the extension task to decide whether the result of the extension task can be obtained yet or whether to continue waiting, or to decide whether an alternative operation should be performed (such as triggering an error handling response or reverting to a fallback code path which carries out the extension task's functionality using instructions processed by the processing circuitry).

In some examples, the extension task status checking instruction may itself specify the associated extension task identifier (e.g. by specifying an immediate operand identifying the extension task identifier or a general purpose register storing the extension task identifier). In other examples, the extension task status checking instruction may not explicitly reference the extension task identifier as an operand. For example, a given system register may by default be designated for storing extension task identifier, and in this case it may be that, without that system register explicitly being referenced in the encoding of the extension task status checking instruction, the extension task status checking instruction causes the processing circuitry to obtain the extension task identifier from that system register, and to obtain the status information corresponding to that extension task identifier. Hence, in some cases, the extension task status checking instruction could, when in use as part of a software routine, be preceded by an earlier instruction which causes the extension task identifier to be written to the system register which would subsequently be referenced by the extension task status checking instruction.

In some examples, in response to an extension status obtaining instruction specifying at least one destination register and an extension task identifier indicative of a specific instance of an extension task offloaded to the extension processing circuitry, the decoding circuitry is configured to control the processing circuitry to assign to the at least one destination register status information indicative of a current status of the extension task at the extension processing circuitry. Hence, one example of the extension tasks status checking instruction could cause the status information to be returned to a particular destination register. Other examples may cause the status information to be written to a memory location.

In some examples, when the low-precision computation extension task is accepted by the extension processing circuitry, the processing circuitry is configured to commit the at least one task offloading instruction without waiting for completion of the low-precision computation extension task by the extension processing circuitry. Hence, subsequent instructions in the program being processed by the processing circuitry do not need to wait on completion of the low-precision computation extension task, but can continue with other operations.

In some examples, the processing circuitry is configured to obtain a result of the low-precision computation extension task in response to the decoding circuitry decoding at least one extension task result obtaining instruction separate from the at least one task offloading instruction. This contrasts with synchronously processed instructions processed on the processing circuitry, for which the result of an operation triggered to be performed by a given instruction would be returned in response to that given instruction itself (e.g. by writing the result to a register). With the extension processing circuitry, as the operation is performed asynchronously, the task offloading instruction can be regarded as committed once the extension processing circuitry has accepted the extension task and then does not involve return of the result as part of the instruction definition of the task offloading instruction. A separate instruction is used to obtain any result of performing the low-precision computation extension task (e.g. the result could be a dot product or outer product result, optionally scaled based on a scaling factor and/or converted to a higher-precision number representation).

The extension task result obtaining instruction could be implemented in different ways. In some examples, the extension task result obtaining instruction could be a load instruction. For example, the extension processing circuitry may have written its result to memory and so a load instruction subsequently executed by the processing circuitry can read the result from memory. Alternatively, the extension task result obtaining instruction could be an instruction which reads a given control register to which the extension processing circuitry makes the result of the extension task available.

In some examples, in response to an extension task result synchronisation instruction specifying at least one destination register and an extension task identifier indicative of a specific instance of an extension task offloaded to the extension processing circuitry, the processing circuitry is configured to assign to the at least one destination register result information obtained from the extension processing circuitry by processing the extension task identified by the extension task identifier. The extension task result synchronisation instruction can be one particular example of the extension task result obtaining instruction mentioned above.

The processing circuitry can continue processing of other instructions while the low-precision computation extension task is performed by, or pending at, the extension processing circuitry. In particular, the low-precision computation extension task, when performed asynchronously by the extension processing circuitry, is non-blocking, so subsequent instructions of the thread of processing that offloads the low-precision computation extension task can continue to make forward progress, even if the low-precision computation extension task is stalled.

In some examples, a central processing unit (CPU) comprises the decoding circuitry, the processing circuitry, the extension processing circuitry and the extension task offload interface described above. Hence, the extension processing circuitry is local to a CPU and provides support for certain extension tasks to be performed asynchronously with respect to other operations processed (synchronously) by the processing circuitry of the CPU. Compared to a remote accelerator coupled to a memory system which is configured via control data structures stored in memory, the extension processing circuitry local to the CPU can be much quicker to configure and by reducing the configuration overhead, it may become feasible to offload much shorter extension tasks, such as a low-precision computation performed on low-precision data, to the asynchronous extension processing circuitry (in contrast for a remote accelerator given the long latency in configuring the accelerator it tends to be that the accelerator is useful only for longer jobs).

In some examples, the decoding circuitry comprises shared decoding circuitry configured to decode arithmetic/logical instructions, branch instructions and load/store instructions of an instruction set architecture supported by the decoding circuitry and the processing circuitry, as well as being configured to decode the at least one task offloading instruction. Hence, the task offloading instruction(s) may be part of a general purpose instruction set also including general purpose arithmetic/logical instructions, branch instructions and load/store instructions. This contrasts with typical accelerator control mechanisms for controlling a remote accelerator where the accelerator commands are designated in an accelerator-specific format which does not support simple arithmetic/logical instructions, branch instructions and load/store instructions. By controlling offloading of the low-precision computation extension task using an instruction of a general purpose instruction set architecture, the extension processing circuitry can be coupled much more closely into a CPU, improving the performance benefits of offloading to the extension processing circuitry.

In some examples, during offloading of the low-precision computation extension task to the extension processing circuitry, the extension processing circuitry is configured to directly access state in architectural registers defined by an instruction set architecture supported by the decoding circuitry and the processing circuitry. By enabling the architectural registers of a processor to be used to define parameters for controlling the low-precision computation extension task with direct access to those registers at the time of offloading the low-precision computation extension task, this can support faster offload than if all parameters of the low-precision computation extension task have to be read from memory by the extension processing circuitry. It will be appreciated that the register state passed to the extension processing circuitry at the time of offload may not be the only parameters or state information needed for the extension processing circuitry to perform the low-precision computation extension task, so some state information could also be read from memory, but by providing at least some parameters to the extension processing circuitry via a path directly from the registers to the extension processing circuitry (not requiring access to a cache or memory), this can speed up offload.

In some examples, the extension processing circuitry may only have direct access to the state in the architectural registers during the offload phase of passing the extension task to the extension processing circuitry. Given the asynchronous nature of the extension task performed on the extension processing circuitry, it may be difficult to allow the extension processing circuitry to continue to access the registers while other operations which need to access the registers are being performed synchronously by the processing circuitry. Therefore, during the main running of the low-precision computation extension task, the extension processing circuitry may not have direct access to state in the architectural registers.

In some examples, the processing circuitry and the extension processing circuitry may share a private cache private to a processing element comprising the processing circuitry and the extension processing circuitry and inaccessible to any other processing element of the apparatus. This can allow the processing circuitry and extension processing circuitry to exchange configuration information, status information and/or results of extension tasks faster than if communication of this information had to be performed via main memory without the extension processing circuitry having direct access into the private cache of the processing circuitry.

In some examples, the processing circuitry and the extension processing circuitry may share translation table walk circuitry configured to control translation table walk operations for obtaining translation table data from a memory system. By reusing the translation table walk circuitry of the processing circuitry for memory accesses triggered by the extension processing circuitry which miss in a translation lookaside buffer, this saves circuit area by avoiding the need to duplicate the translation table walk circuitry at both processing circuitry and extension processing circuitry. In some examples, the processing circuitry and extension processing circuitry could also share at least one translation lookaside buffer (TLB) for caching address translation information obtained in a translation table walk operation. However, it is also possible for the extension processing circuitry to have its own dedicated TLB looked up for memory accesses triggered by the extension processing circuitry to identify address translation information. Nevertheless, if the TLB of the extension processing circuitry detects a miss for a given address to be accessed by the extension processing circuitry, the shared translation table walk circuitry associated with the processing circuitry can be used to perform the translation table walk operation to find the missing address translation information.

Specific examples are now described with reference to the drawings.

Figure 5:
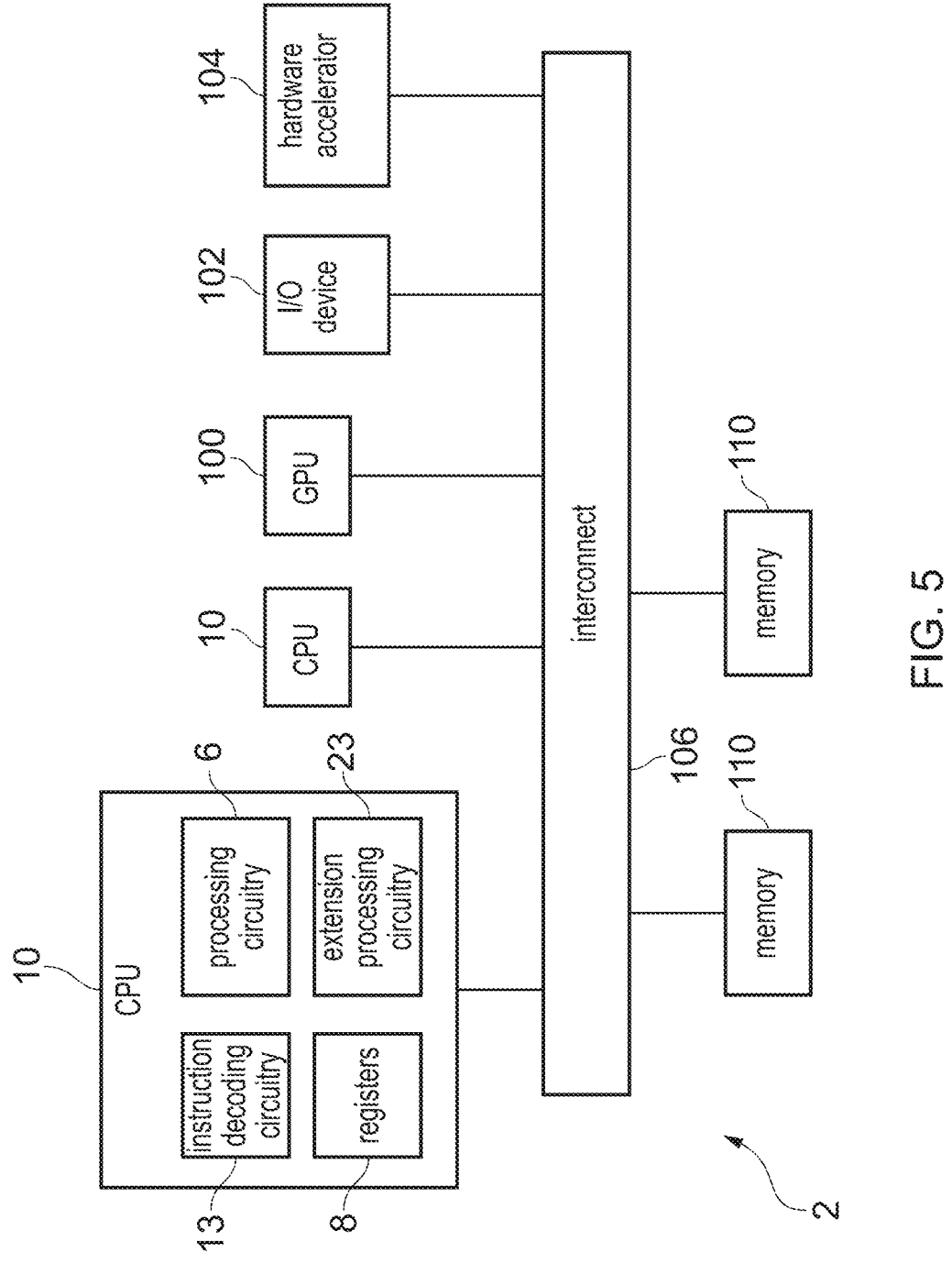
FIG. 5 illustrates an example of a processing system.

FIG. 1 illustrates an example of an apparatus 10. The apparatus 10 may for example be a data processing system such as a system-on-chip or collection of chiplets implementing at least one processor and its memory storage. For example, the components of the apparatus 10 illustrated in FIG. 1 may be part of a given processor, e.g. a central processing unit (CPU). While FIG. 1 shows the processor as a standalone apparatus (a design for an individual processor core could, for example, be licensed as a separate product from other parts of a wider processing system), as shown in FIG. 5 discussed further below the apparatus 10 could also form part of a wider processing system 2 which comprises two or more processors 10 capable of executing respective threads of processing in parallel with each other.

The apparatus 10 includes decoding circuitry 13 which decodes instructions fetched from an instruction cache or a memory system, and processing circuitry 6 which processes the instructions decoded by the decoding circuitry 13 to perform data processing operations on operands obtained from registers 8 or the memory system, to generate processing results which may be written back to the registers 8 or to the memory system. The processing circuitry 6 comprises a pipeline comprising a number of pipeline stages for performing respective functions in response to the instructions, with the pipeline stages operating in a pipelined manner so that a later pipeline stage can be performing a later stage of processing on an older instruction in parallel with an earlier pipeline stage performing an earlier stage of processing on a younger instruction which appears later in program order than the earlier instruction. In some instances, it is also possible to perform out-of-order processing where a younger instruction in program order can bypass an older instruction to be executed in an order which differs from the order in which those instructions appear in program order.

Instructions processed by the pipeline of the processing circuitry 6 may be processed synchronously, such that for a given instruction the access to registers 8 to obtain instruction operands and writeback to registers 8 to write a processing result can be synchronised in timing relative to register read/write operations for other instructions. For synchronously processed arithmetic/logical instructions, a given instruction type may be associated with a certain defined number of cycles required for the instruction to execute, so that if the instruction is dispatched for execution in a given cycle then its result is guaranteed to be available by a certain subsequent cycle. Also, for the synchronously processed instructions, the architectural result of that instruction is made available as part of executing the instruction itself, so commitment of the synchronously processed instruction implies the result of that instruction will be made available for reference by a subsequent instruction. If a given synchronously processed instruction is stalled, then any dependent operations referencing the result of that instruction may also be blocked from being executed (unless a speculation mechanism is provided to predict the result of the synchronously processed instruction to break the chain of dependency).

The apparatus 10 also has extension processing circuitry 23 to which the decoding circuitry 13 can, in response to an extension task offloading instruction, offload an extension task which is to be performed by the extension processing circuitry 23 asynchronously with respect to other data processing operations performed by the processing circuitry 6. Unlike for synchronously processed instructions, the result of the extension task is not guaranteed to be available once the extension task offloading instruction has been committed. Instead, separate instructions (separate from the offloading instruction) may be decoded to allow querying of whether the extension task is complete and to obtain any results. The extension task offloading instruction is non-blocking in that it can be committed when the extension processing circuitry 23 has accepted the offloaded extension task (or otherwise indicated that it is unavailable to accept the offload extension task), but does not require its commitment to be delayed until the extension task is actually performed. This means that younger instructions in the thread of processing including the extension task offloading instruction can continue to be processed on the processing circuitry 6, while the extension task is performed asynchronously on the extension processing circuitry 23 in the background of ongoing processing on the processing circuitry 6. The instructions processed synchronously on the processing circuitry 6 may, at a later point of program flow, query whether the extension processing circuitry 23 has completed its task and if so obtain any results either directly from extension processing circuitry 23 or from a cache or memory. As shown in FIG. 1, the apparatus 10 has an extension task offload interface 24 providing a direct configuration path for the decoding circuitry 13 to cause offloading of an extension task to the extension processing circuitry 23, where the direct configuration path is separate from the path by which the processing circuitry 6 issues requests (e.g. coherence transactions) to a memory system to request access to data stored in the memory system. This means the exception processing circuitry 23 can be integrated directly into the regular processing circuitry 6 of a processor, rather than being a remote accelerator accessed via the memory system. In some examples, the extension processing circuitry 23 may have direct access to the register file 8 used by the processing circuitry 6, which can be useful during the handover phase when an extension task is being offloaded to the extension processing circuitry 23 or when the result of the extension task is being transferred back to the processing circuitry 6, to allow parameters of the extension task and results to be shared between the processing circuitry 6 and the extension processing circuitry 23 via the registers 8. It is also possible for such sharing of parameters and results to be via a private cache (e.g. level 1 cache) associated with the processing circuitry 6.

One type of extension task supported by the extension processing circuitry 23 is a low-precision computation extension task, which will be described in more detail below. The low-precision computation extension task comprises processing one or more sets of data elements for which at least one of the sets of data elements comprises low-precision data represented in a low-precision number format with lower precision than a single-precision floating-point format, e.g. with fewer significant bits than the 24-bit significand (1 implicit bit and 23 stored fraction bits) used to represent the single-precision floating-point number. In some cases, the low-precision number format comprises 16-bit precision or less. In some cases, the low-precision number format comprises 8-bit precision or less. 8-bit precision or lower can be particularly useful for supporting machine learning kernels which operate on quantized input data quantized to 8 bits or less per data element, which is an increasingly prominent workload type aimed at reducing the memory footprint and bandwidth requirements of machine learning operations such as LLM training or inference. By offloading the low-precision computations to the extension processing circuitry, the computations can be carried out asynchronously using relatively lightweight circuit logic, and given the relatively high frequency with which such low-precision computations can be required for machine learning workloads, this can free up a lot of CPU execution resource for other operations, providing a significant performance speed up at low additional circuit area cost.

FIG. 2 illustrates a method of processing instructions. At step 200, the decoding circuitry 13 decodes instructions. At step 202, the processing circuitry 6 performs data processing operations in response to the instructions decoded by the decoding circuitry 13.

FIG. 3 illustrates a method of offloading a low-precision computation extension task. At step 210, it is determined whether an instruction decoded by the decoding circuitry 13 is a task offloading instruction corresponding to a low-precision computation extension task. In some examples, it could be the decoding circuitry 13 itself which determines that a given instruction is a low-precision computation extension task offloading instruction (or at least that the instruction is an extension task offloading instruction which generically requires offload of an extension task to the extension processing circuitry, even if the offloaded extension task is not yet identified as being a low-precision computation extension task). In some examples where the task offloading instruction is an extension task offloading instruction which specifies an extension operation identifier which identifies the particular type of extension task to be performed, the extension operation identifier may not necessarily be decoded by the decoding circuitry 13, and it might be downstream circuitry (either at the processing circuitry 6 or at the extension processing circuitry 23) that interprets that extension operation identifier and so determines that this particular instance of the extension task offloading instruction represents the low-precision computation extension task offloading instruction.

Also, in some examples, the task offloading instruction may be an instruction type which is more generic and can also be used for other operations not involving offload of an extension task to the extension processing circuitry 23. For example, in some implementations the configuration interface 24 for controlling the extension processing circuitry 23 may include a set of system registers associated with the processing circuitry 6. A system register updating instruction may have an encoding which identifies a register identifier of the particular system register to be updated, and so some instances of system register updating instructions may specify an identifier of one of the system registers for controlling the extension processing circuitry 23 (e.g. a launch register for controlling launching of a command to the extension processing circuitry 23) and so be treated as the task offloading instruction, while other instances of system register updating instructions could specify an identifier of a different system register which has a function unrelated to the extension processing circuitry 23 and so this system register updating instruction would not be treated as the task offloading instruction. Similarly, if the configuration interface for controlling the extension processing circuitry 23 includes memory mapped control registers, the task offloading instruction may be a store instruction which specifies as its store target address an address mapped to the relevant launch control register used to trigger offload commands to the extension processing circuitry 23, but other instances of store instructions specifying other addresses would not be treated as a task offloading instruction. In this case, it might be that the circuitry which identifies whether a particular decoded instruction represents the task offloading instruction is circuitry provided within the processing circuitry 6 (e.g. in a load/store unit) which checks the target address of a store instruction and determines whether that target address is an address mapped to the launch control register.

Hence, at step 210, some circuitry determines whether a decoded instruction decoded by the decoding circuitry 13 is a task offloading instruction, but it will be appreciated that the circuitry performing step 210 is not necessarily the decoding circuitry 13 itself. If the decoded instruction is not a task offloading instruction, then at step 211 another type of instruction is processed.

If the decoded instruction is a task offloading instruction corresponding to a low-precision computation extension task, then at step 212 the decoding circuitry 13 and/or the processing circuitry 6 controls offloading of the low-precision computation extension task to the extension processing circuitry 23. The low-precision computation extension task is to be performed asynchronously with respect to other operations performed by the processing circuitry 6. At step 214, the task offloading instruction is committed, without waiting for the low-precision computation extension task to be completed by the extension processing circuitry 23.

FIG. 4 illustrates a method of processing the low-precision computation extension task using the extension processing circuitry 23. At step 230, the extension processing circuitry 23, having accepted the offload of the low-precision computation extension task, obtains control parameters for controlling how the low-precision computation extension task is to be performed. For example, the control parameters can be obtained from registers of the processing circuitry 6 (e.g. via signal paths of the extension task offload interface 24). While some parameters (e.g. identifying the type of extension task, any control arguments, and one or more addresses of input data or control data for the low-precision computation extension task) may be transferred directly via the interface 24, it is also possible for some control parameters to be obtained by the extension processing circuitry 23 from the memory system by issuing load requests to addresses identifying a given memory region allocated for such control parameters. The memory system requests issued by the extension processing circuitry 23 may reuse a portion of the memory system interface provided for the processing circuitry 6 to access memory, e.g. accessing a shared private cache and/or reusing some address translation resources such as translation table walk circuitry.

At step 232, the extension processing circuitry 23 reads one or more input sets of data elements, including at least one set of data elements represented as low-precision data in a low-precision number format less precise than FP32 (single-precision floating-point). In some examples, the input data comprises two or more sets of data elements (e.g. weight data and activation data for a neural network training or inference algorithm) each represented in a low-precision number format (either with symmetric number formats which are the same for each set, or with different number formats for one set compared to another).

At step 234, if the input data is in a packed (interleaved) format, an unpacking operation is performed by the extension processing circuitry 23 to generate unpacked data. For example, data elements may be extracted at intervals of a given stride from a given block of data stored in memory, to de-interleave a given stream of multiple interleaved streams of data stored in memory.

At step 236, at least one low-precision computation is performed on the (unpacked) sets of data elements, with at least one of the sets of data elements (and in some cases each set of data elements) being processed in a low-precision number format. Such low-precision computations can be executed with relatively lightweight circuit logic compared to higher-precision operations, as the circuit area is much smaller if any multipliers and adders can be implemented with narrower bitwidths. In some examples, the low-precision computation includes a dot product operation (also known as inner product operation) to calculate a sum of a number of pairs of elements selected from respective first and second sets of elements. For example, the dot product of two sets of n data elements, A1, A2, A3, . . . , An and B1, B2, B3, . . . , Bn would correspond to the result of A1*B1+A2*B2+A3*B3+ . . . +An*Bn. In some examples, the low-precision computation comprises an outer product operation to calculate a two-dimensional matrix of result elements R[1 . . . n, 1 . . . m] from two vectors of elements A[1 . . . n] and B[1 . . . m] and an accumulator matrix C[1 . . . n, 1 . . . m], where result element R[i,j]=A[i]*B[j]+C[i,j]. Multiple rounds of the outer product operation could be performed on different input vectors, with the result R[i,j] from one instance of the outer product operation becoming the accumulator matrix C[i,j] for a subsequent round.

At step 238, one or more post-processing steps may be performed by the extension processing circuitry 23 on the result(s) of the low-precision computation. For example, the post-processing may include scaling the low-precision computation results based on a scaling factor (e.g. multiplying by the scaling factor), and/or converting the result(s) to a higher-precision format.

At step 240, the result(s) of the low-precision computation (either with or without post-processing) are written by the extension processing circuitry 23 to a storage location accessible to the processing circuitry. The storage location is accessible to the processing circuitry 6 by the processing circuitry 6 executing a result obtaining instruction (e.g. load instruction, system register read instruction, or extension task synchronisation instruction (XSYNC—discussed further below)), where the result obtaining instruction is separate from the task offloading instruction that caused the offload. The storage location to which the result(s) is written can be memory system locations (e.g. in a cache or main memory), and/or one or more registers of the processing circuitry 6.

FIG. 1 discussed above shows components of an individual processor 10. However, FIG. 5 shows an example showing the processor in a wider context 10 of a data processing system 2. The processing system 2 comprising at least one CPU 10 which comprises the decoding circuitry 13, processing circuitry 6, registers 8 and extension processing circuitry 23 (and extension task offload interface 24, although the interface is not explicitly shown in FIG. 5) as discussed above. There could also be at least one other CPU 10 which does not comprise the extension processing circuitry. The CPUs 10 are examples of memory system requesters which access shared memory 110 via an interconnect 106. The memory 110 may also be shared with other types of memory system requester, such as a graphics processing unit (GPU) 100, input/output (I/O) device 102 or remote hardware accelerator 104. The hardware accelerator 104 is coupled to the memory system interconnect 106, remote from the CPU 10. Software executing on a CPU 10 can configure the hardware accelerator 104 to perform a particular class of processing function on data stored in memory 110, by configuring control data structures also stored in the memory 110 which define command queues and/or other parameters for controlling the hardware accelerator 104. Hardware accelerator commands are defined as part of a command set dedicated to a particular hardware implementation of hardware accelerator, rather than being generic ISA instructions in the instruction set supported by the instruction decoding circuitry 13 of a CPU 10. As the configuration path between the processing circuitry 6 of a CPU 10 and the hardware accelerator 104 is via memory-based data structures, offloading of operations from CPU 10 to hardware accelerator 104 is much slower than offloading of an extension task from processing circuitry 6 to extension processing circuitry 23, as memory accesses to those structures may contend for bandwidth on the memory system interconnect 106 shared with the other requesters 10, 100, 102. The same applies where the CPU 10 configures the GPU 100 to carry out processing.

Figure 6:
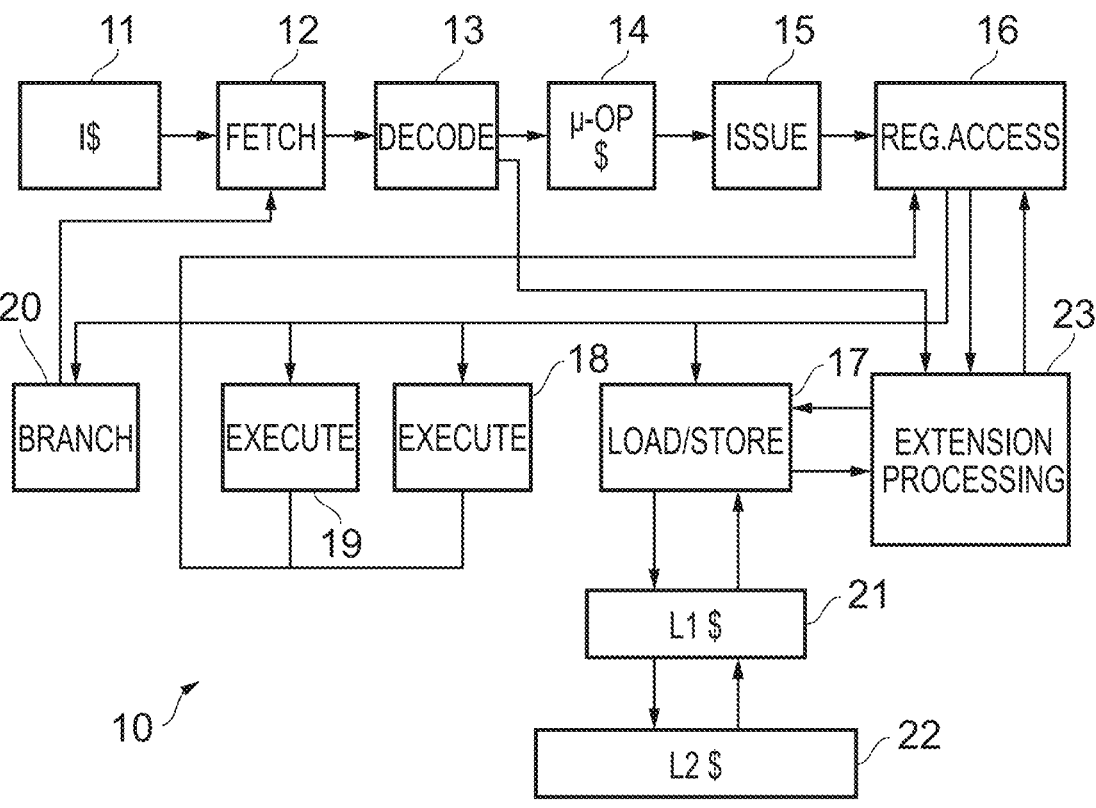
FIG. 6 illustrates a first example of the extension processing circuitry.
Figure 7:
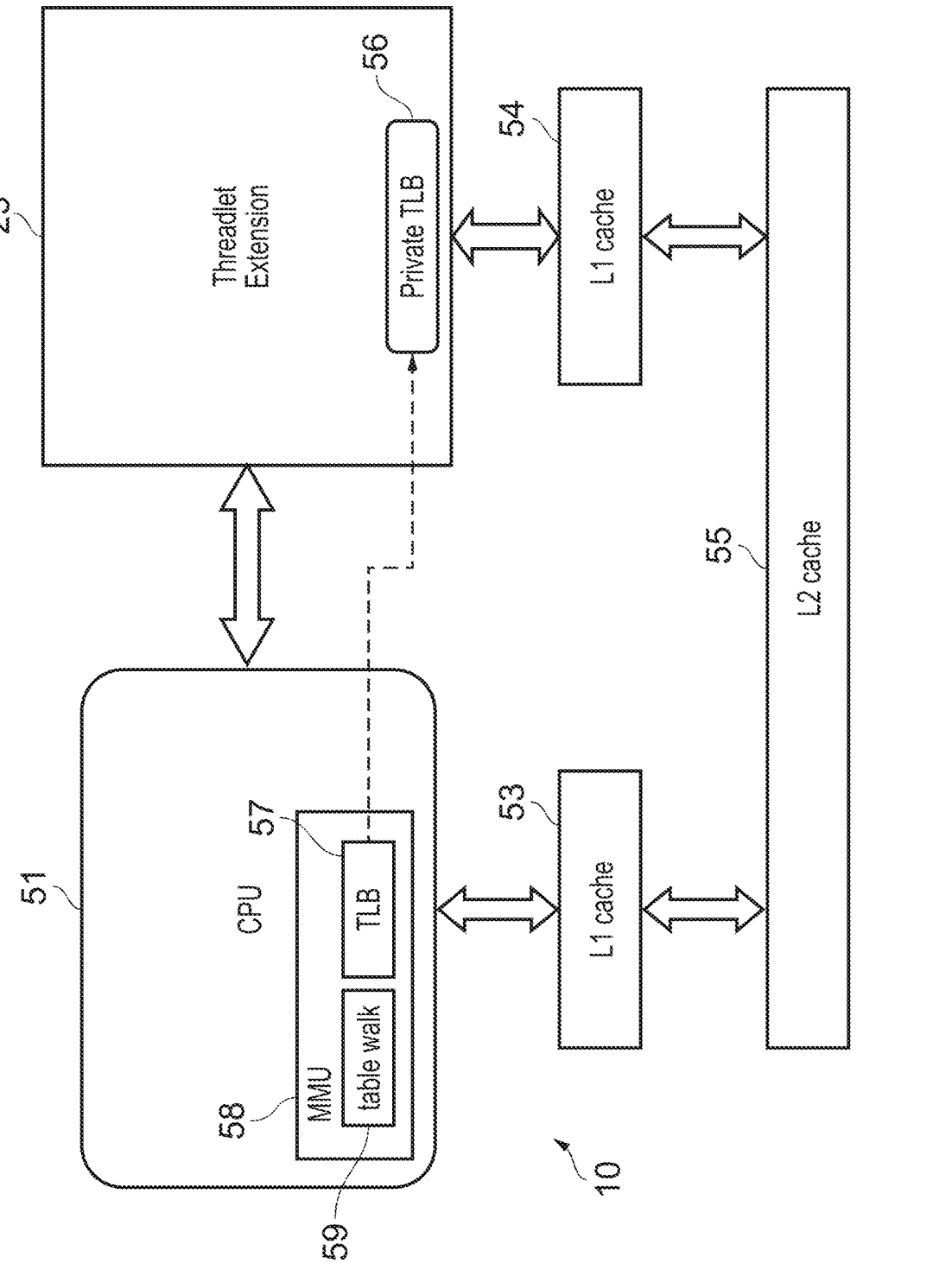
FIG. 7 illustrates a second example of the extension processing circuitry.

FIGS. 6 and 7 show two examples of how the extension processing circuitry 23 could be provided in association with a particular processor 10 (CPU).

In the example of FIG. 6, the processor (CPU) 10 is schematically shown to have a pipelined configuration, which for the purposes of brevity and clarity is shown in a conceptual representation here. The illustrated pipeline stages comprise an instruction cache 11, a fetch stage 12, a decode stage 13, a micro-op cache 14, an issue stage 15, and a register access stage 16. A sequence of instructions is retrieved from memory (not shown) and cached in the instruction cache 11. The fetch stage 12 controls which instructions are retrieved as the sequence of instructions and these instructions are then decoded in the decode stage 13. This decoding essentially identifies the type of each instruction, as well as any further operands specified by the instruction, and generates control signals to control the remainder of the apparatus to perform the data processing operation(s) defined by the instruction. Decoding the instructions may comprise splitting an instruction into one or more micro-ops, and these micro-ops can be cached in the micro-op cache 14. The final stage of the pipeline before execution is the issue stage 15, where instructions (or micro-ops) are queued pending the availability of the register values they specify as operands and the corresponding functional unit of the data processing pipeline which will carry out the defined operation. Generally the data processing operation(s) defined by the instructions are carried out by the functional units that form part of the data processing pipeline, namely the load/store unit 17, the execute unit 18, and the execute unit 19. These latter execute units may for example be arithmetic logic units (ALUs), floating point units (FPUs), and so on. The functional units that form part of the data processing pipeline perform their data processing operations on data values which are provided from a set of registers (conceptually represented by the register access stage 16 in the figure) and result values of those data processing operations are returned to the set of registers. The load/store unit 17 is provided for the purpose of storing values from the set of registers to the memory system, of which only a level 1 cache 21 and a level 2 cache 22 are shown in the figure. At least the L1 cache 21 is private to the CPU 10 and the L2 cache 22 could be either private or shared with another CPU 10, when part of a wider data processing system. The data processing apparatus 10 is also shown to comprise a branch unit 20, which is used to execute branch instructions and which may feed back information about branch outcomes to the fetch stage 12 for use in training a branch predictor provided in the fetch stage 12 for predicting outcomes of branch instructions.

The processor 10 also comprises extension processing circuitry 23, which is provided to support efficient performance of one or more defined functions, including the low-precision computation extension task described earlier. The extension processing circuitry is closely associated with the data processing pipeline and is configured to perform the defined function (also referred to herein as a delegated task or extension task) in response to a delegation signal received from the data processing pipeline. The extension processing circuitry 23 is an example of a threadlet extension (TE). The sequence of operations it carries out to perform the defined function can be referred to as a threadlet. The extension processing circuitry 23, although closely associated with the data processing pipeline, is configured to perform the delegated task asynchronously to the data processing operations performed by data processing pipeline. Threadlets are functions or collections of operations that can be executed asynchronously relative to other CPU activity once launched. The directive or command sent to the extension processing circuitry 23 to initiate the delegated task is generated in response to an extension task offload instruction, such as an extension start instruction defined for this purpose in the instruction set of the data processing pipeline. Thus, an extension start instruction progresses along the data processing pipeline in the manner that any other CPU instruction would, but when the decoding circuitry 13 identifies the extension start instruction it can signal directly to the extension processing circuitry 23. The close integration of the extension processing circuitry 23 with data processing pipeline is illustrated by the fact that the extension processing circuitry 23 has direct access to the load/store unit 17, and thus it shares the data processing pipeline's path to memory (e.g. having access to the private cache 21 of the CPU 10). The extension processing circuitry 23 can also share translation table walk circuitry (not shown in FIG. 6) which is used to obtain address translation information from memory. The extension processing circuitry 23 also has access to the set of registers 8 accessed by register access stage 16, such that for example, the extension start instruction can specify one or more registers as operands, and the values from these registers are then passed directly to the extension processing circuitry 23 in association with the command sent to initiate the delegated task. Upon completion of the task, results of the delegated task can be returned to the register values via an extension synchronisation instruction.

FIG. 7 schematically illustrates an alternative implementation of the apparatus 10 according to some examples. This example provides a comparison to the examples of FIG. 6, in which examples the extension processing circuitry was closely embedded with the data processing pipeline, to the extent that those instances of extension processing circuitry may be considered to be within the CPU. In the example of FIG. 7, the apparatus 10 comprises a CPU 51 and separate extension processing circuitry (threadlet extension) 23 which are not as closely integrated. For example this is illustrated by the fact that each has its own path to memory, with an L1 cache 53 private to the CPU 51 and an L1 cache 54 private to the threadlet extension 23. They share the L2 cache 55 (which can still be regarded as a private cache of the CPU 51 as this cache may not be shared with any other memory system requester, so a cache coherency protocol implemented by system interconnect 106 may treat the L2 cache as if it is a private cache). Nevertheless, the threadlet extension 23 remains tightly coupled to the CPU 51, and can be launched quickly when an extension start instruction is encountered in the CPU pipeline specifying the function this threadlet extension 23 performs. The threadlet extension 23 can get data directly from CPU registers at the start of its execution. Upon completion, it can return values via an extension synchronisation instruction. FIG. 7 also shows the threadlet extension 23 as having its own private TLB 56, in which it can cache currently used address translations. As a preparatory step before or associated with the delegation signal, content from the TLB 57 in the CPU 51 can be copied into the private TLB 56 in order to pre-warm this cache before the threadlet begins operation. If a memory access request issued by the extension circuitry 23 misses in its private TLB 56, a signal may be issued to a memory management unit (MMU) 58 of the CPU 51 which causes translation table walk circuitry 59 of the CPU 51 to obtain address translation information from memory and return the required address translation information to the private TLB 56 of the threadlet extension processing circuitry 23 for use in translating a memory address specified by the memory access request.

Figure 8:
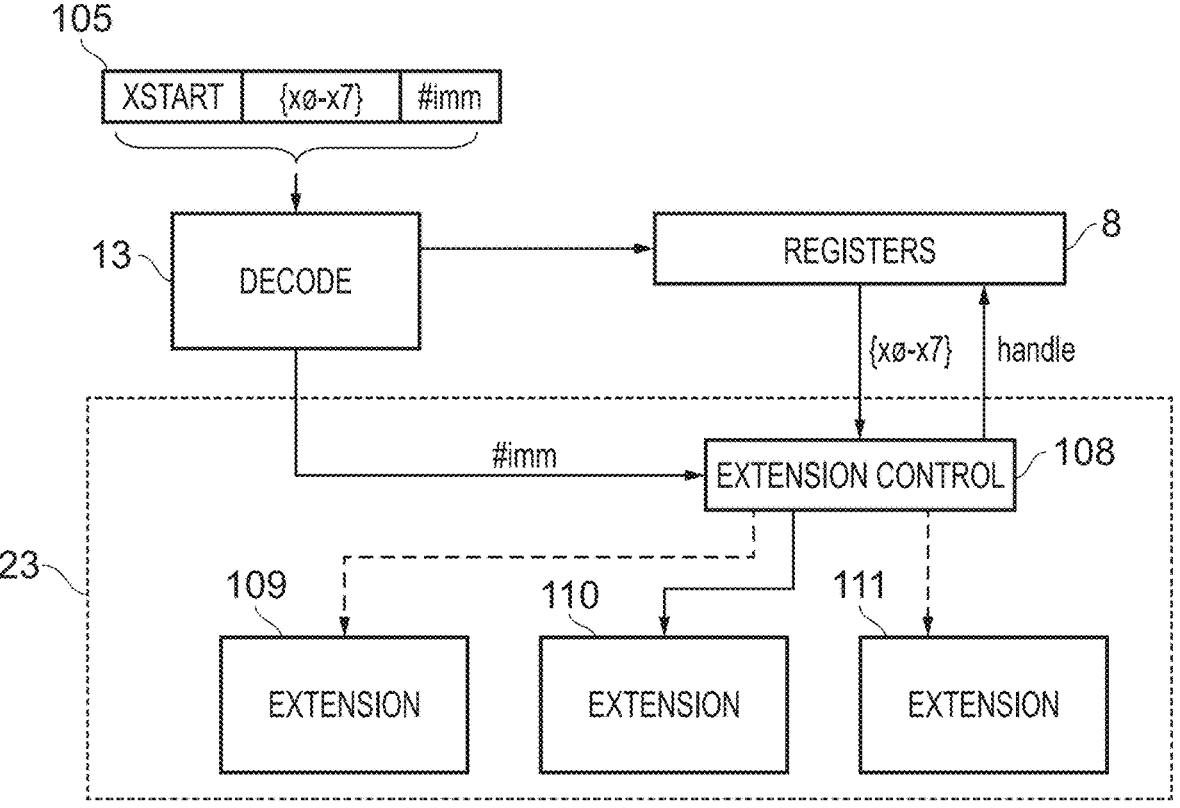
FIG. 8 illustrates an example of a task offloading instruction.

FIG. 8 schematically illustrates an extension start instruction for delegating a task to one of several instances of extension processing circuitry 109, 110, 111 (collectively corresponding to the extension processing circuitry 23 described earlier), in accordance with some examples. Here, the XSTART instruction takes the form: XSTART {x0-x7}, #imm. In this example, there are multiple instances of extension processing circuitry and the immediate value #imm is used as an extension operation identifier to select between them. Thus an XSTART instruction 105 of this form, when decoded by the CPU's decoder 13, causes the content of registers x0-x7 to be retrieved from the registers 8. Extension control circuitry 108, on the basis of the immediate value #imm (or signals based on the immediate value #imm) directs the register values to the selected extension processing circuitry 110. In this case, the other instances of extension processing circuitry 109 and 111 are not activated by this instruction. While FIG. 8 shows an example where the extension operation identifier is specified as an immediate value, other examples could designate the extension operation identifier using a register operand.

Each instance of the extension processing circuitry 109, 110, 111 could for example be configured to perform a different type of extension task. At least one of the extension processing circuit instances supports a low-precision computation extension task as its extension task. Hence, when the extension operation identifier (#imm) specified by the XSTART instruction corresponds to a low-precision computation extension task, this will control the corresponding instance of extension processing circuitry 110 to perform that low-precision computation extension task. In some examples, extension processing circuit instances 109, 110, 111 may be provided for supporting two or more distinct types of low-precision computation extension task, with the extension operation identifier of the XSTART instruction distinguishing which particular low-precision computation extension task to perform. The register operands x0-x7 passed with the extension offload command can specify parameters such as addresses of data to be accessed in memory within the low-precision computation extension task and any other control parameters. The particular steps to be taken to perform the low-precision computation extension task do not need to be explicitly identified by the control parameters or the XSTART instruction, as they are hard-wired into the circuit logic of the extension processing circuitry (documentation available to the software developer or compiler developer may identify what operations should be expected when requesting that an extension task with a given value for the extension operation identifier (#imm) is performed on a given system implementation). Different system implementations may support different sets of extension tasks using the extension processing circuitry, so the extension processing circuitry 23 (or the configuration interface for controlling the extension processing circuitry) may support a mechanism by which a given extension task offload may be rejected if the particular system implementation running the software requesting the offload does not actually support the requested type of extension task. This failure indication may be used by the software to select an alternative fallback path (e.g. a sequence of operations using instructions processed synchronously on the main processing pipeline).

As shown in FIG. 8, when the extension processing circuitry 23 accepts a given extension task, the extension processing circuitry 23 assigns an extension task identifier ("handle") to the specific instance of the extension task that has been accepted, and returns the handle to the processing circuitry 6, e.g. by writing it to a given destination register of the register file 8. The handle can be used to differentiate respective instances of extension task, and can be used to query status of a particular instance of an extension task or trigger return of results. The extension task identifier (handle) is distinct from the extension operation identifier (#imm), since the extension operation identifier identifies a particular class of extension task, so will be the same whenever that class of extension task is to be performed, while the extension task identifier distinguishes different instances of extension tasks (and so if the same class of extension task is requested multiple times to be performed on different data values, say, each instance of requesting the extension task is assigned a different extension task identifier).

Figure 9:
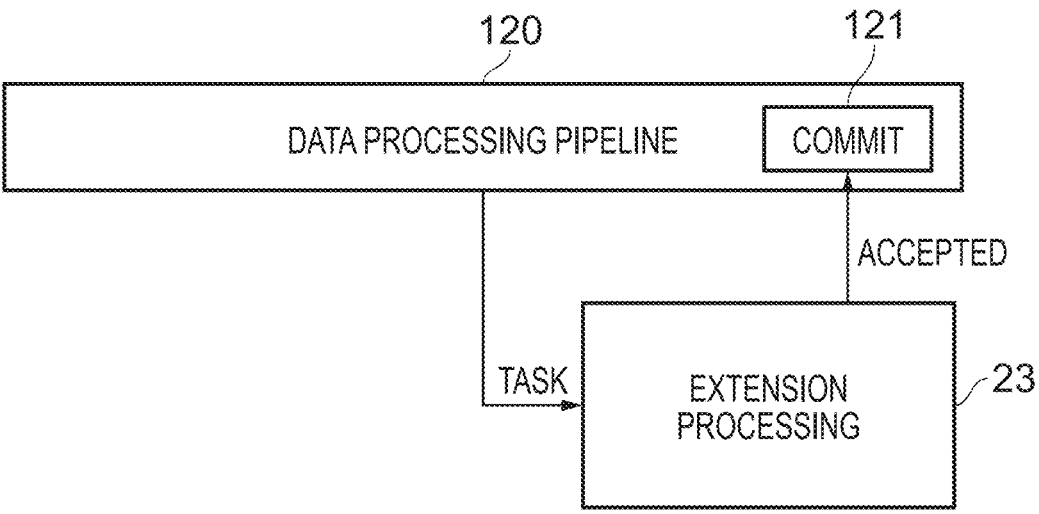
FIG. 9 illustrates commitment of the task offloading instruction upon acceptance of the low-precision computation extension task by the extension processing circuitry.

FIG. 9 schematically illustrates extension processing circuitry accepting a delegated task in accordance with some examples. The data processing pipeline 120 of a processor 10 is shown to include a commit stage 121. An instruction which passes through this data processing pipeline 120 will finally be committed, when it is definitively known that this instruction should be executed, or will be cancelled when it is established that this instruction should not be executed. For example, when the data processing pipeline follows a prediction for a particular branch made by its branch prediction unit, when that branch is resolved as taken or not taken, further instructions which were provisionally executed on the assumption that the branch prediction was correct can be committed. Here, an XSTART instruction has caused a task to be delegated to the extension processing circuitry 122, and commits when the XSTART instruction is known to have been correctly executed (e.g. any speculation associated with the XSTART instruction has been resolved as correct) and the extension processing circuitry 122 signals to the data processing pipeline 120 that it is accepting the task. The XSTART instruction could also be committed if the extension processing circuitry 23 rejects accepting the extension task, which could arise because, say, the requested extension task is not supported by the particular extension processing units 109, 110, 111 present on this system implementation, or because while supported, the extension processing units 109, 110, 111 are currently busy (e.g. because they were previously assigned to perform an extension task on behalf of the different processing context to the thread currently executing).

Figure 10:
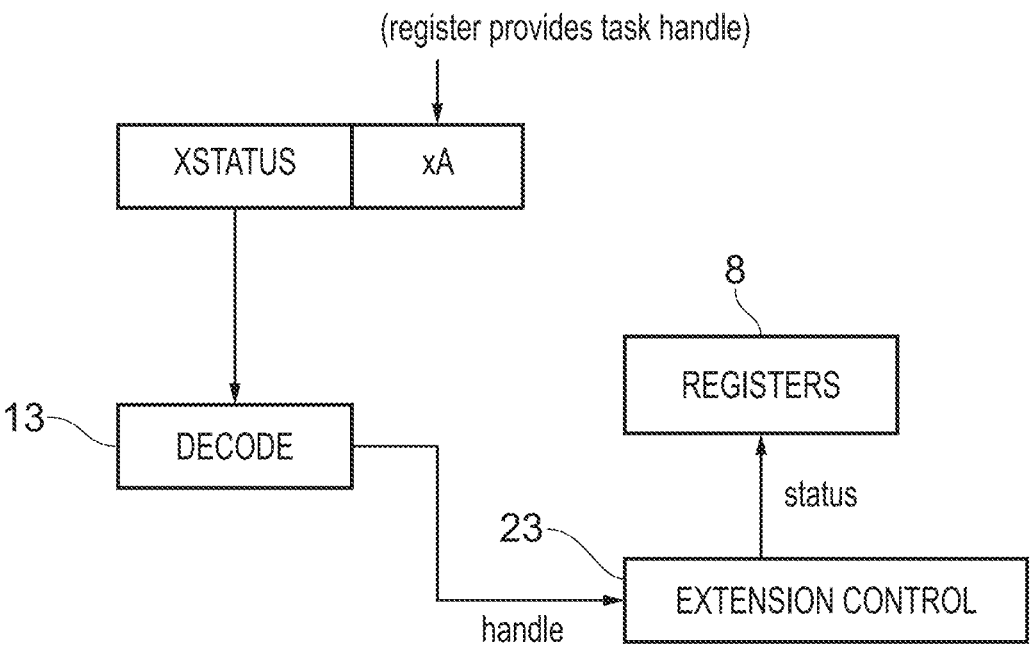
FIG. 10 illustrates an example of an extension task status checking instruction.

FIG. 10 illustrates an example of an extension task status checking instruction (XSTATUS instruction) specifying an extension task identifier indicative of a specific instance of an extension task offloaded to the extension processing circuitry—i.e. the handle that was returned by the extension processing circuitry 23 at the time of accepting the offloaded extension task. For example, the extension task identifier can be specified in a register referenced by a register field (xA) encoded in the XSTATUS instruction. In response to the XSTATUS instruction, the instruction decoding circuitry 13 provides a signal to the extension processing circuitry 23 specifying the extension task identifier. In response, the extension processing circuitry 23 returns a status indication to the processing circuitry 6, e.g. by writing to one of the registers 8. The status indication may distinguish information such as whether the extension processing circuitry 23 has completed the assigned extension task or has been interrupted, or whether an error has occurred, for example.

Figure 11:
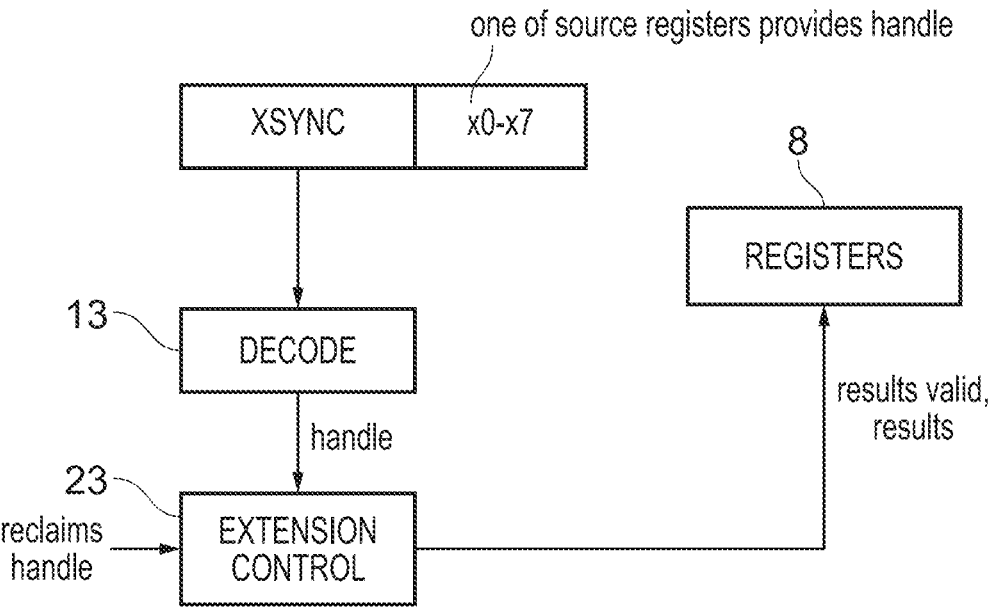
FIG. 11 illustrates an example of an extension task result obtaining instruction.

FIG. 11 illustrates an example of an extension task result synchronisation instruction (XSYNC instruction) specifying an extension task identifier indicative of a specific instance of an extension task offloaded to the extension processing circuitry. For example, the extension task identifier can be specified in a register referenced by a register field encoded in the XSYNC instruction. The XSYNC instruction can also encode other register fields which may define destination registers to which result values are to be written in response to the XSYNC instruction. In response to the XSYNC instruction, the instruction decoding circuitry 13 provides a signal to the extension processing circuitry 23 specifying the extension task identifier. In response, the extension processing circuitry 23 returns one or more result values to respective registers 8 of the processing circuitry 6. As well as results being passed via registers 8, it is also possible that the completion of the extension task may signal that further results are available from memory, which have been written to memory during the extension task.

While FIGS. 8 to 11 show examples of dedicated instruction types for controlling the extension processing circuitry 23, as mentioned above it is also possible to provide a register-based control interface for configuring the extension processing circuitry 23 and requesting return of status or result values, in which case similar functionality may be controlled by instructions which write to a control register (e.g. a system register or memory-mapped register). In some cases, it may be that the ISA does not support a single instruction which can both write an operand from a source general purpose register to a system register and read a value from a system register to a destination general purpose register, so in some cases the functionality of one of the instructions discussed above may be split into two separate instructions:

a system register write instruction to write an operand (e.g. an extension task identifier of a specific instance of an extension task to be referenced in a subsequent instruction) from a specified source general purpose register to a given system register; and a system register read instruction, to read a value (e.g. the status information corresponding to the XSTATUS instruction described above, or part of the result information returned by the XSYNC instruction described above) corresponding to the extension task identifier stored in the given system register, and return that value to a specified destination general purpose register.

Some more specific examples of the low-precision computation extension task are now described, in particular where the extension processing circuitry 23 is a tightly-coupled CPU-accelerated extension accelerating low-precision general matrix-vector multiplication (GEMV), general matrix-matrix multiplication (GEMM) or similar kernels (some of the most frequently used kernels in large language model (LLM) inference algorithms), by asynchronously overlapping low-precision computations with other computations (e.g. high-precision computations, or other computations unrelated to GEMV/GEMM) performed on the processing circuitry 6 of a CPU 10. The example below is based on a GEMV implementation where the offloaded extension task comprises a dot product (inner product) operation performed on two vectors of data elements represented in a low-precision number format to generate a scalar quantity representing the sum of products of corresponding pairs of elements extracted from the respective vectors. However, a similar approach can be used for GEMM implementations, which perform an outer product operation on two vectors of data elements represented in low-precision format to generate a two-dimensional matrix of result elements (each result element depending on a product of a respective pair of first/second data elements selected from the two input vectors, optionally accumulated with a corresponding element of an accumulator matrix). Hence, the techniques discussed here are not limited to acceleration of dot product operations for a GEMV workload, and an extension task variant could also be supported implementing an outer product operation.

With the surge of Large Language Models (LLMs) and their widespread use in various applications, achieving LLM performance gains has become a matter of increased significance. While many research efforts are focused on accelerating low-precision LLM inference on GPUs, finding inference acceleration opportunities on CPUs 10 is also important. Low-precision computations are becoming increasingly prevalent as often low precision is sufficient to make good machine learning predictions and the use of data represented in lower-precision number formats translates into bandwidth and energy savings and reduced memory footprint.

The extension processing circuitry 23 asynchronously overlaps selected functions with other CPU activity, hence achieving performance enhancements with minimal hardware resources and little software friction. A key use case is in providing a low-precision tightly coupled CPU-accelerated extension that promises LLM performance gains when coupled with more feature-rich CPU pipelines capable of handling higher-precision formats. While alternative solutions like providing a coprocessor for accelerating matrix operations can also target matrix acceleration which could benefit LLMs, such coprocessors would be synchronous and so incur more hardware resources than an asynchronous extension processing circuitry 23 such as the one proposed here.

We henceforth elaborate on the methodology we followed to identify the acceleration opportunity for LLMs. We chose 4-bit quantized Llama2-7b as our LLM of interest (llama.cpp), and Graviton 3 (with Neoverse V1 which has a 2 256-bit scalable vector extension pipelines) as our target hardware.

First, we profiled Llama using perf to identify bottlenecks. The profiling revealed that two kernels dominated the execution time: ggml_gemv_q4_0_8×8_q8_0 and ggml_vec_dot_q6_k_q8_k. These two kernels are quantized GEMV and GEMM-related kernels, and their codes follow a similar pattern. ggml_gemv_q4_0_8×8_q8_0 and ggml_vec_dot_q6_k_q8_k together constitute over 50% of Llama's execution time.

Figure 12:
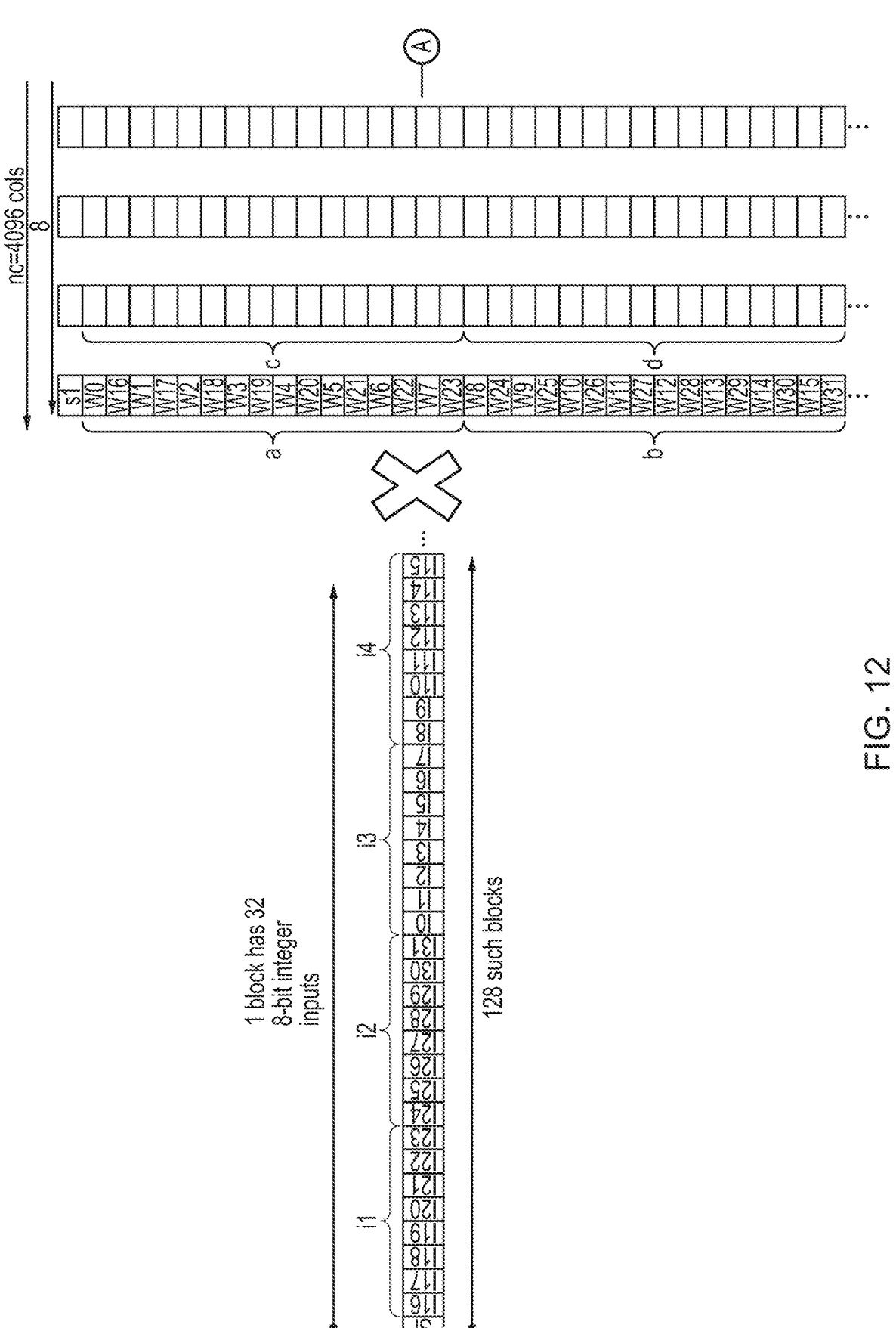
FIG. 12 illustrates an example of weight and input block data formats for a large language model (LLM) kernel function, where the weight and input block data is represented in a low-precision number format.
Figure 12:
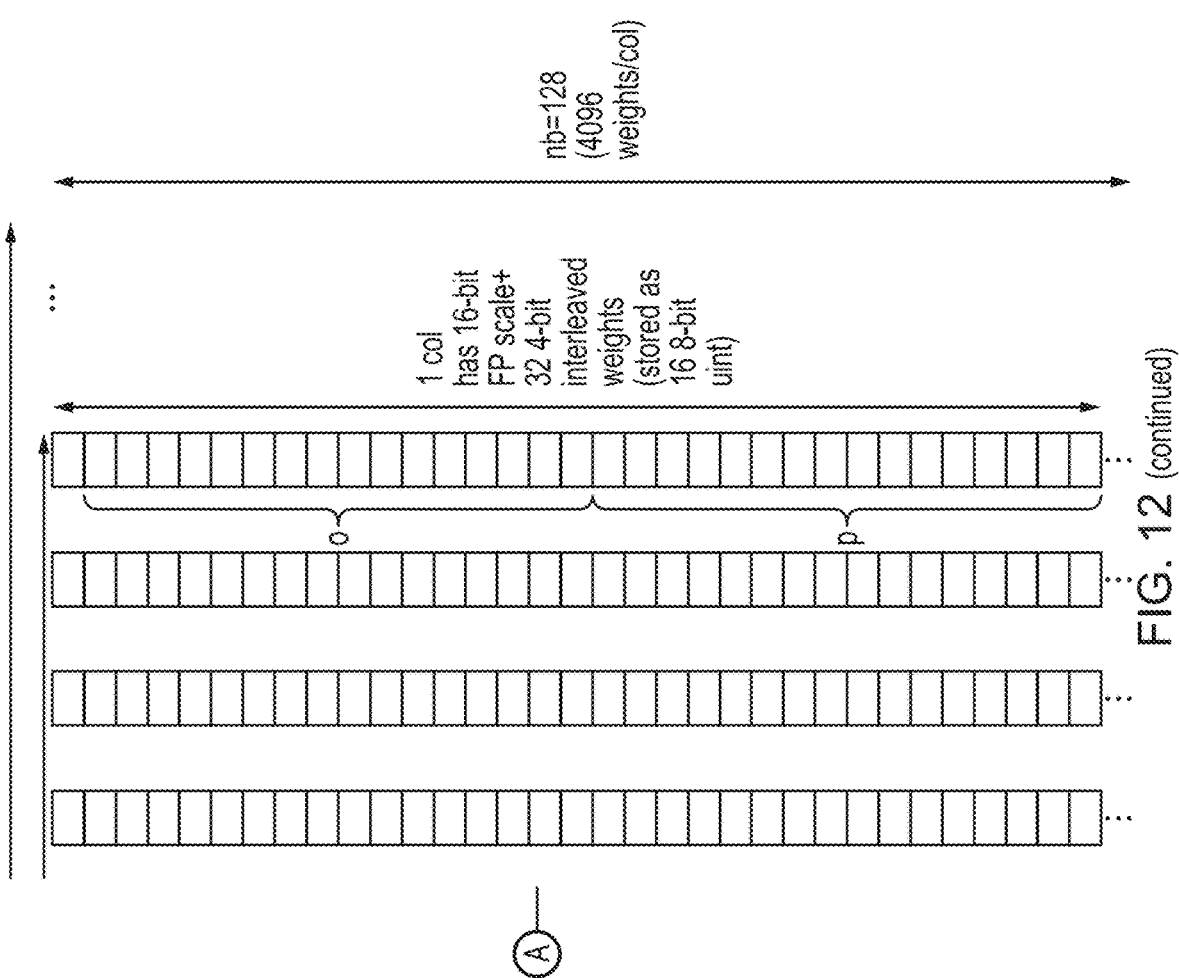
Figure 13:
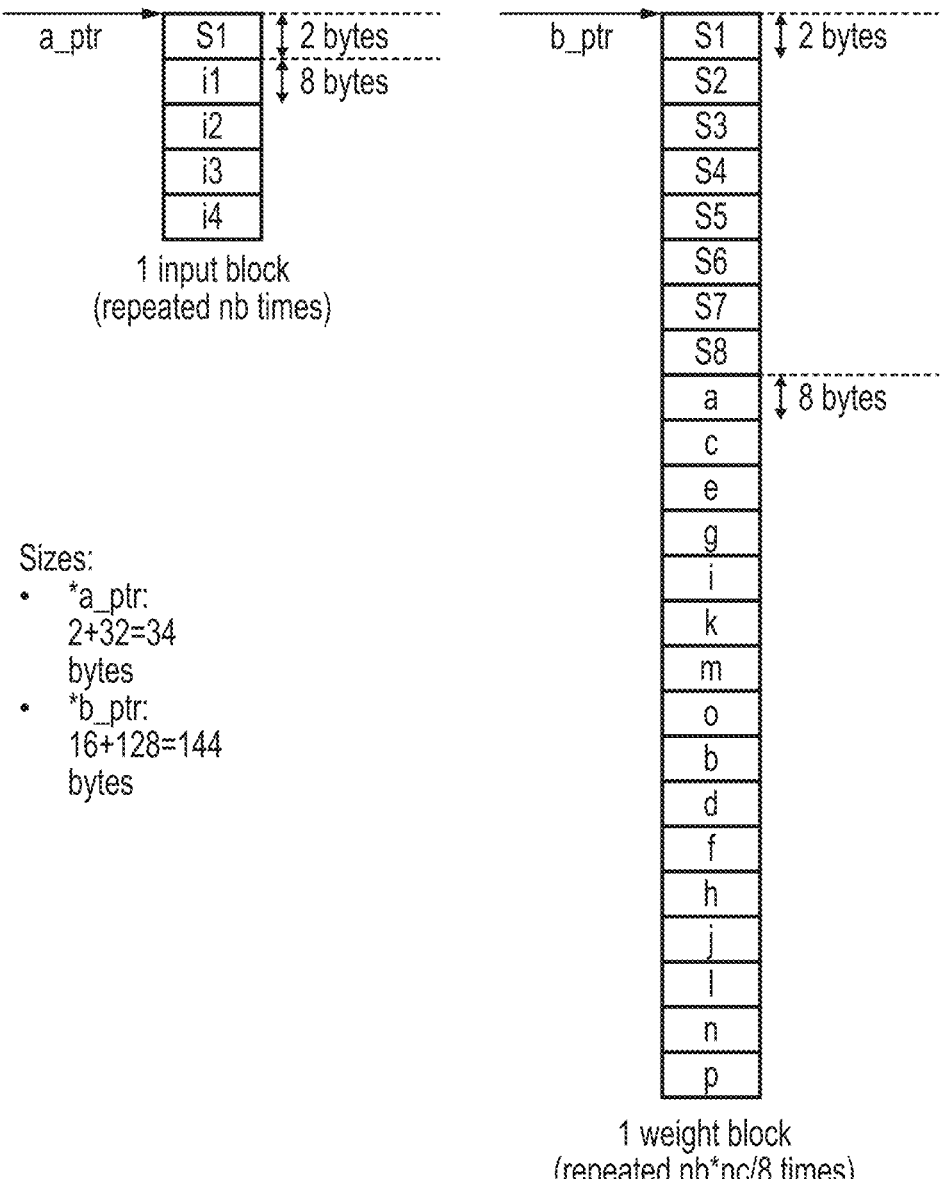
FIG. 13 illustrates a memory layout for the weight and input block data.

Next, we zoomed into the SVE-optimized 4-bit GEMV kernel implementation for Graviton 3 (ggml_gemv_q4_0_8×8_q8_0). This kernel expects inputs and weights interleaved in a certain layout in gguf format, prepared offline before inference. The kernel then implements a nested loop that computes the matrix-vector multiplication in a sliding window fashion: vertically then horizontally. For the specific kernel that we studied, an input block and a weight block format layouts are shown in FIG. 12. FIG. 13 shows the memory layout of one input and one weight block. Hence, kernels processing the gguf input data involve a dot product operation which sums results of many multiplications of respective pairs of 8-bit and 4-bit elements, both of which are low-precision compared to the single-precision floating-point that is often used as standard in many algorithms.

Figure 14:
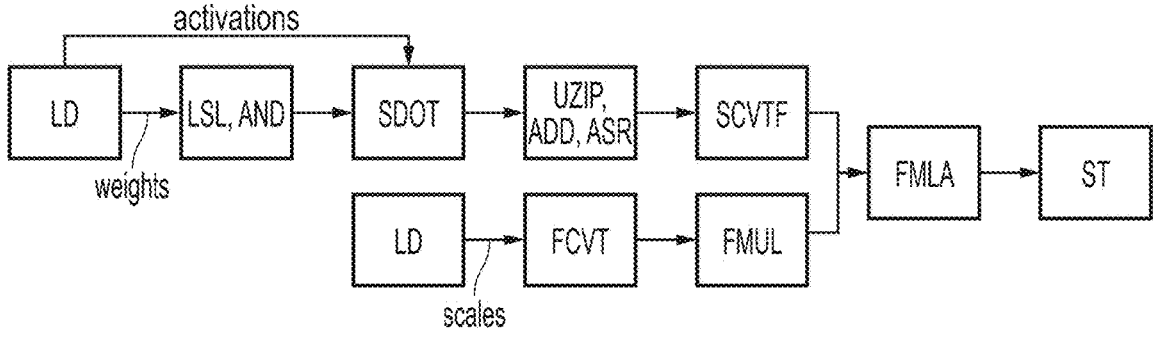
FIG. 14 illustrates a data flow for one example LLM kernel function.

For this particular kernel, the dataflow for one block is shown in FIG. 14. Particularly, for one block, the packed 4-bit weights are loaded and unpacked or expanded into 8-bit values using LSL (left shift) and operations. Inputs are broadcasted into registers. Then a series of SDOT operations perform the dot-product between the unpacked weights and the inputs, whereby each SDOT handles 4 columns of weights, each column consisting of 8 8-bit unpacked weights, along with their corresponding inputs. UZIP, ADD, and ASR are then used to reduce the SDOT results into 8 32-bit values. SCVTF converts these 8 32-bit values from signed integers into FP32. Scales (of weights and inputs) are loaded, converted from FP16 to FP32 (FCVT), and multiplied (FMUL). FMLA then adds the multiplied scale factor to the reduced SDOT values, and the result (8 32-bit values) is stored. It will be appreciated that the particular operations shown here are based on one example ISA provided by Arm®, but similar functions can be supported in other ISAs.

By looking closely at the dataflow, one can decouple the high precision computation operations from the low-precision computation operations. The low-precision computation operations consist of weight unpacking (LSL, AND), SDOT, reduction (UZIP, ADD, ASR), and format conversion (SCVTF). The remaining scale-related operations (FCVT, FMUL) and FP accumulation (FMLA) constitute the high-precision computations.

Figure 15:
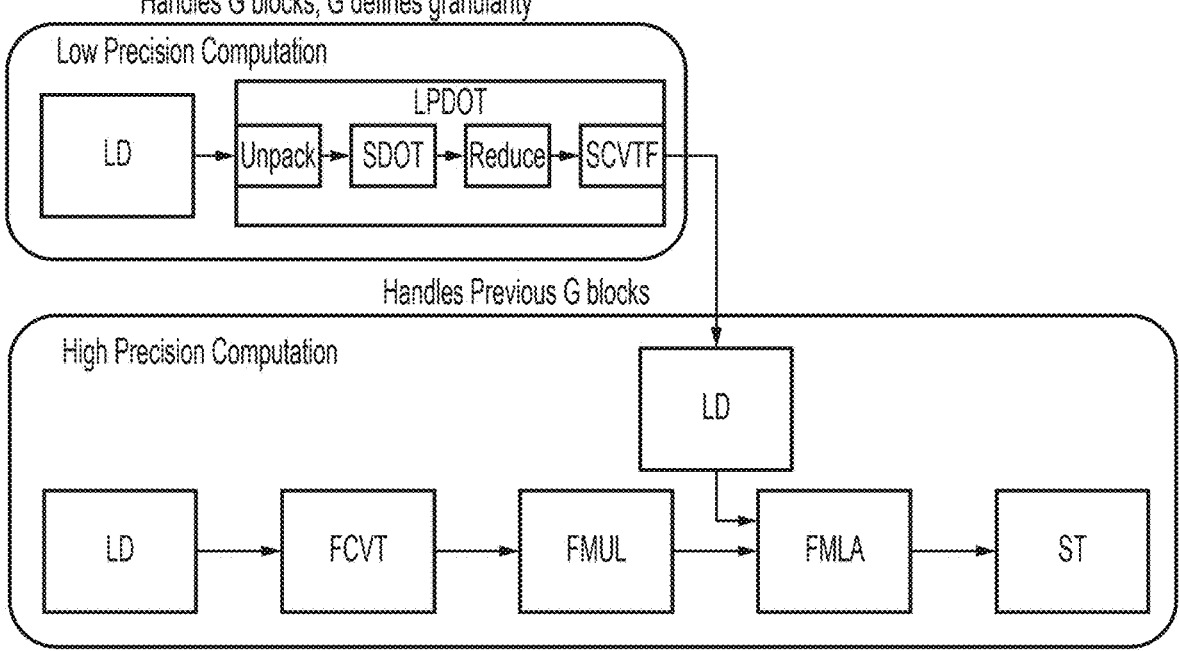
FIG. 15 illustrates an example data flow in which low-precision computation operations are handled asynchronously by the extension processing circuitry.
Figure 16:
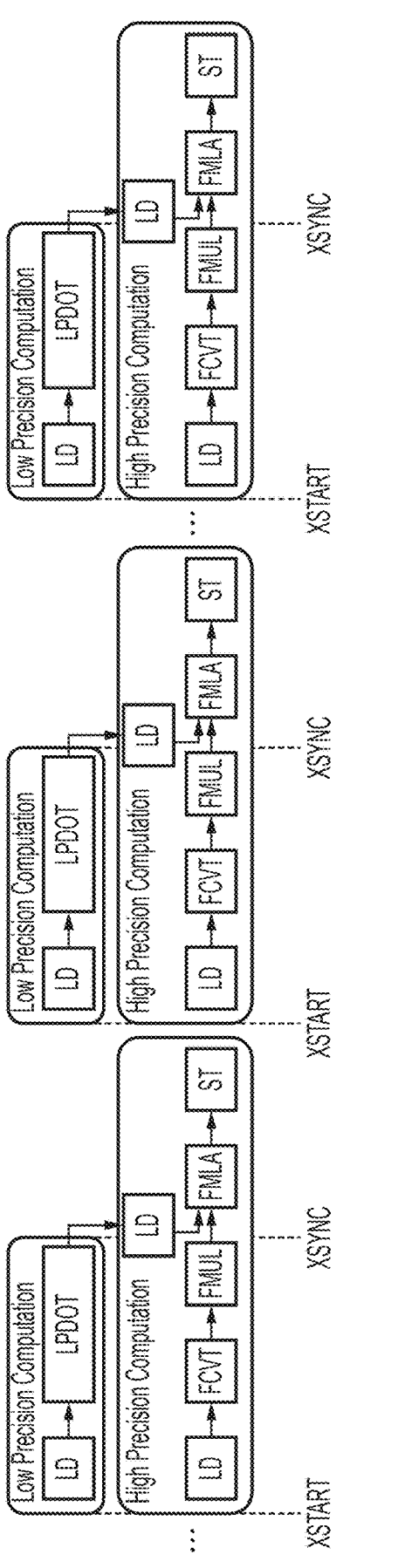
FIG. 16 illustrates an example dataflow for asynchronously overlapping the low-precision computation operations with higher-precision computation operations performed by the processing circuitry.

Hence, in one embodiment, as shown in FIG. 15, the low-precision computation, performed by a CPU-coupled hardware extension 23 referred to as "low-precision dot-product" or LPDOT, can overlap with the execution of the high-precision computations performed by the CPU's processing circuitry 6. The choice to offload (asynchronously) the low-precision computations to the extension processing circuitry 23 is due to the lightweight nature of these operations, and the ability to implement them with minimal hardware resources. LPDOT is depicted in FIG. 15 which shows the proposed dataflow of GEMV implemented by the extension processing circuitry 23, and FIG. 16 shows how LPDOT would be asynchronously overlapping the other high-precision tasks performed by the CPU's processing circuitry 6 based on synchronous instruction execution. In this example, the low-precision computation extension task includes steps of: loading low-precision data element sets from memory, unpacking at least one low-precision data element set to de-interleave one or more streams from a set of interleaved streams of data, a dot product operation to compute one or more dot product values each corresponding to a sum of products of pairs of first/second elements (one or both of which comprises low-precision data in a low-precision number format), a reduction operation to add dot product results to reduce to fewer dot product results, and a format conversion operation to convert the dot product results to a higher-precision format. In this example, the offloaded extension task excludes the higher-precision computations such as FCVT, FMUL, FMLA which are performed at higher precision.

As shown in FIG. 16, XSTART instructions (or other task offloading instructions as described above) are used at the point of offload to cause the extension processing circuitry 23 to be assigned a given instance of a low-precision computation extension task (LPDOT). Result synchronisation instructions (XSYNC) are executed by the CPU at the point beyond which subsequent instructions executed by the CPU will be dependent on the results generated by the extension processing circuitry 23 from processing the extension task. Commitment of the XSYNC instructions will be dependent on the results actually being available from the extension processing circuitry 23, so that any subsequent dependent instructions are delayed if those results are not available yet. Hence, the XSYNC instructions allow the executed program executing on the main CPU processing pipeline 10 to synchronise with completion of the extension task. In some software use cases, to improve overlap between operations performed at the processing circuitry 6 of the CPU pipeline 10 and operations performed at the extension processing circuitry 23, a double-buffering approach could be used in which a second instance of an extension task writes to a second buffer data structure in the memory system in parallel with the instructions executing on the CPU pipeline 10 consuming data written to a first buffer data structure by the extension processing circuitry when processing a first instance of an extension task. Subsequently, the CPU pipeline 10 and extension processing circuitry 23 can alternate use of the buffers so that while the CPU consumes from one buffer the extension processing circuitry 23 is writing to the other buffer. It will be appreciated that this double-buffering technique is a software-controlled technique which does not have any specific hardware to support it, but is controlled by software setting the addresses to which results are to be written by the extension processing circuitry 23 appropriately such that the result buffers used for a series of extension tasks alternate between two or more buffer regions.

Figure 17:
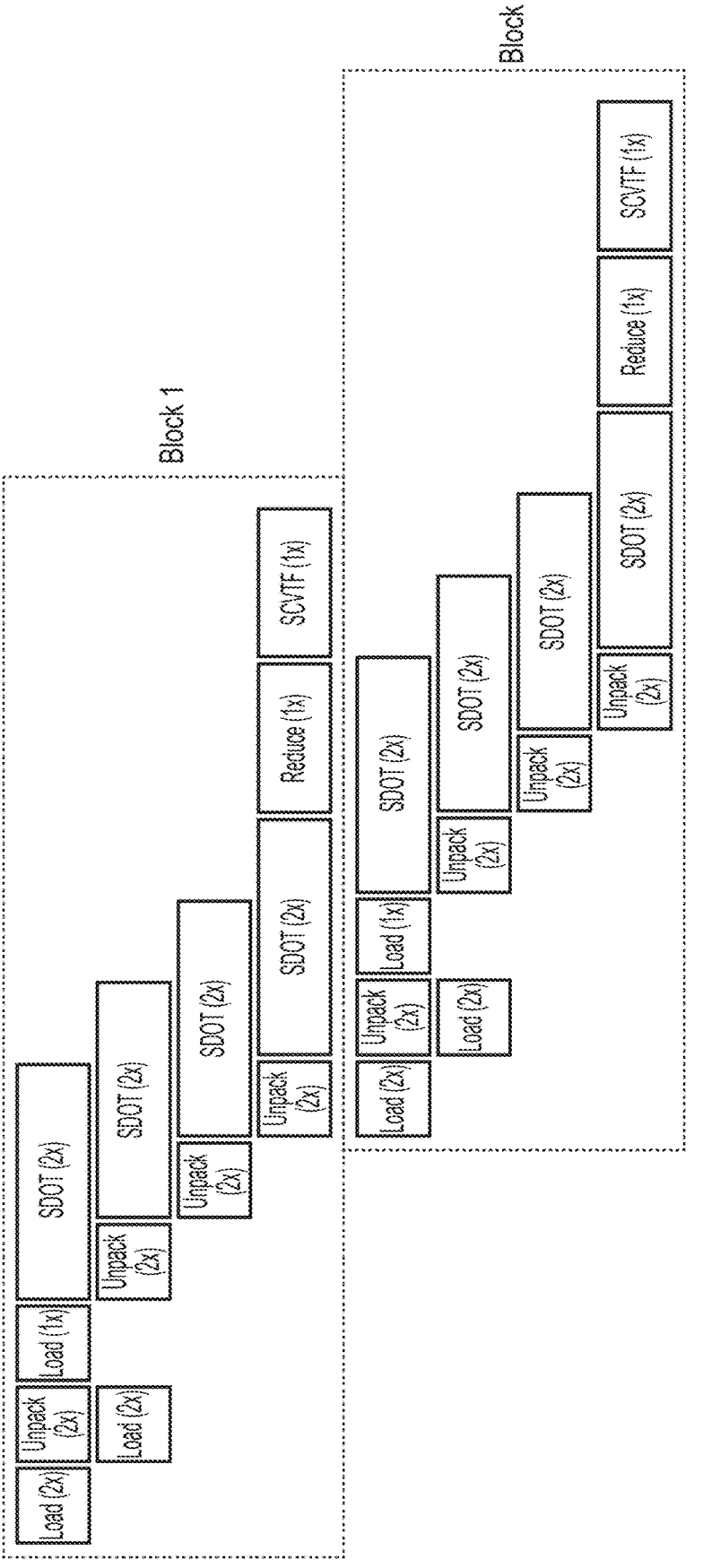
FIG. 17 illustrates an example of pipelining low-precision computations.

One can construct a pipeline within the extension processing circuitry, to allow multiple extension tasks or processing of multiple sets of input data within one extension task to be performed at least partially in parallel in a pipelined manner. For example, FIG. 17 shows a possible pipelined arrangement for overlapping loading and unpacking of respective portions of input data elements and the subsequent dot-product operations performed on those elements. It will be appreciated that the particular pipelined arrangement can vary significantly based on implementation choice.

We evaluated the potential savings/costs of such extension processing circuitry 23. Our preliminary studies based on the ggml_gemv_q4_0_8×8q8_0 kernel have revealed that offloading low-precision computations to the extension processing circuitry 23 and overlapping these with the higher-precision computations on the CPU can result in a significant speed up compared to an implementation performing all these operations purely on the CPU pipeline using synchronous instruction processing logic, e.g. resulting in almost 2× speed up (i.e. reducing the execution time for the ggml_gemv_q4_0_8×8_q8_0 kernel by almost half). It is expected that other similar kernels (e.g. ggml_vec_dot_q6_k_q8_k kernel) will have a similar speedup profile. Also, analysis has shown that the additional circuit area cost of the extension processing circuitry 23 is relatively small (e.g. around 1% of the overhead of a typical modern CPU core), so this can be implemented as a lightweight implementation to accelerate low-precision LLMs and other ML workloads that rely heavily on matrix-vector multiplication.

While the analysis above has focused on some particular GEMV kernels for the purpose of illustrating the acceleration opportunities, it will be appreciated that the claimed subject-matter is not limited to these particular kernels. Other examples may accelerate GEMM kernels by implementing an outer product variant of the low-precision extension task. Hence, providing asynchronous extension processing circuitry 23, accessible for a CPU via an interface separate from the standard load/store memory system interface, for supporting low-precision computations (such as dot product, outer product or other matrix/vector multiplication functions) on data at sub-SP precision (in some cases, 8-bit or lower precision) can be particularly useful to give performance uplift at relatively little circuit area cost.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 18:
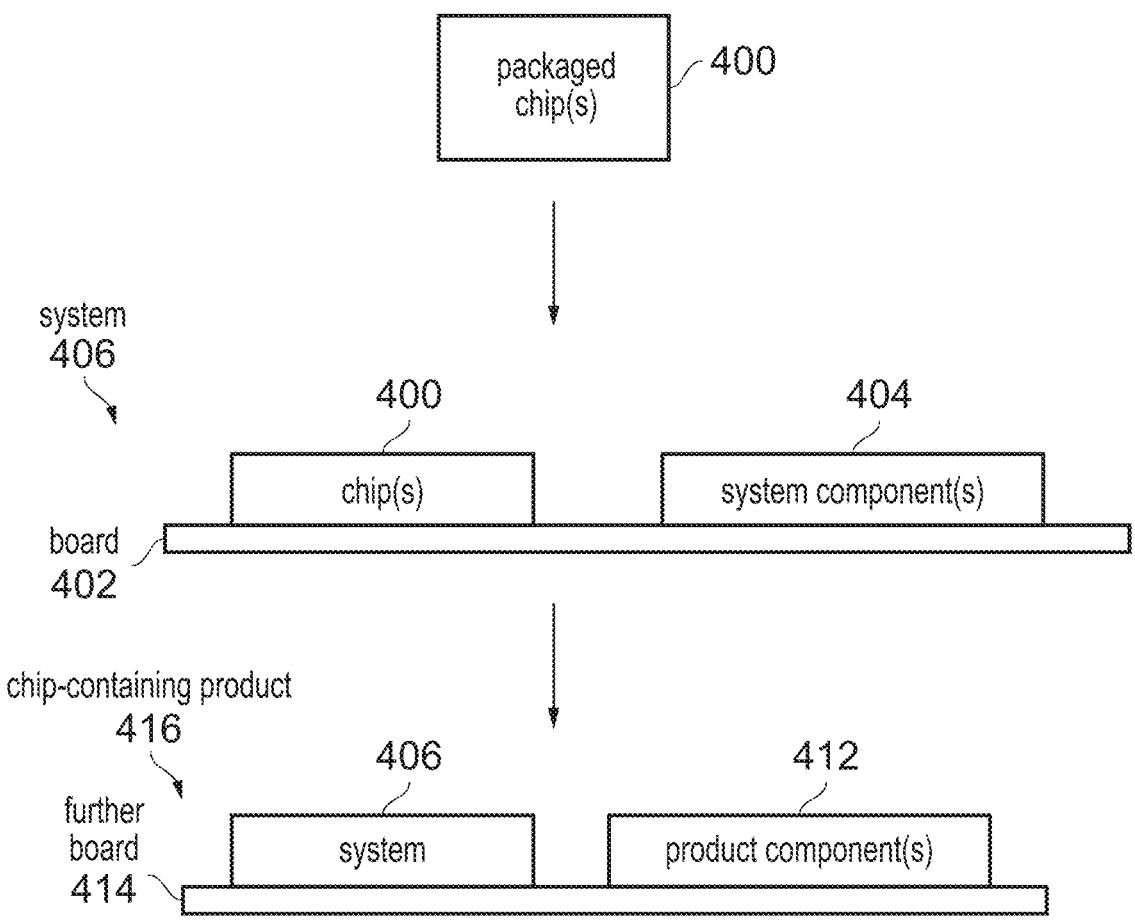
FIG. 18 illustrates a system and a chip-containing product.

As shown in FIG. 18, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Figure 19:
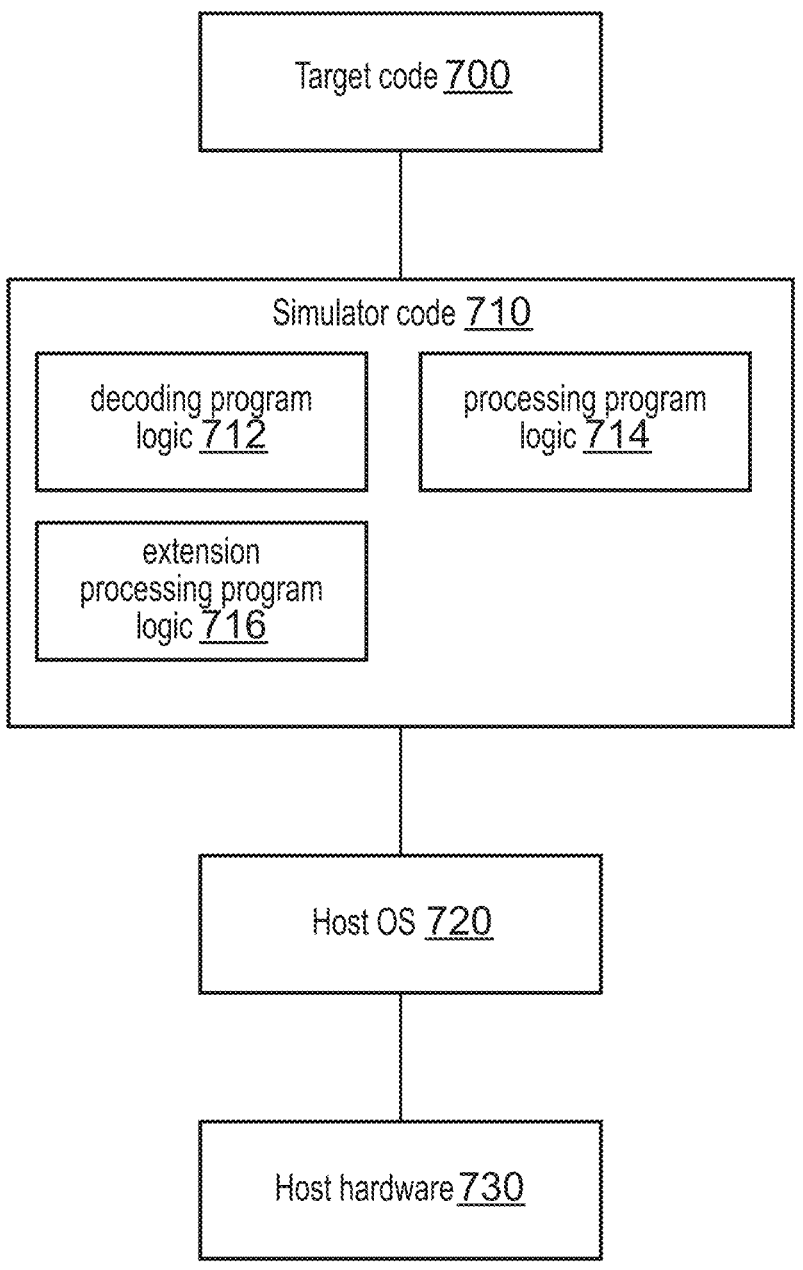
FIG. 19 illustrates a simulation example.

FIG. 19 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include applications, operating systems and a hypervisor) which is the same as the interface of the hardware architecture being modelled by the simulator program 710. Thus, the program instructions of the target code 700, including the task offloading instruction, extension task result synchronisation instruction, extension task status checking instruction, etc., may be executed from within the instruction execution environment using the simulator program 710, so that a host computer 730 which does not actually have the hardware features of the apparatus 2 discussed above can emulate these features.

The simulator program 710 includes decoding program logic 712, processing program logic 714 and extension processing program logic 716 which emulates the functionality of the decoding circuitry 13, processing circuitry 6 and extension processing circuitry 23 described earlier. Hence, the decoding program logic 712 decodes instructions of the target program code and the processing program logic 714 controls the host computer 730 to perform data processing operations in response to the instructions decoded by the decoding program logic 712. For example, the simulator code 710 may include a number of instances of function code corresponding to the respective instructions defined in the instruction set architecture used by the target code 700. The decoding program logic 712 may comprise instructions which check the encoding of a given instruction of the target code 700 and select the appropriate function corresponding to that instruction type, depending on the instruction encoding. The processing program logic 714 may comprise the function code itself which is selected by the decoding program logic 712, and which comprises a series of instructions, written in the native instruction set architecture supported by the host hardware 730, to simulate the functionality of the given instruction. In response to an extension task offloading instruction which specifies that the offloaded extension task is the low-precision computation extension task, the extension processing program logic 716 simulates offloading of a low-precision computation extension task to simulated asynchronous extension processing circuitry simulated as being accessible via an extension task offload interface separate from a simulated memory system access interface. The low-precision computation extension task comprises processing of low-precision data represented in a number format with lower precision than a single-precision floating-point format.

Some examples are set out in the following clauses:

1. An apparatus comprising:

decoding circuitry configured to decode instructions;

processing circuitry configured to perform data processing operations in response to the instructions decoded by the decoding circuitry;

extension processing circuitry configured to perform a low-precision computation extension task asynchronously with respect to other data processing operations performed by the processing circuitry, the low-precision computation extension task comprising processing one or more sets of data elements for which at least one of the sets of data elements comprises low-precision data represented in a low-precision number format with lower precision than a single-precision floating-point format; and an extension task offload interface separate from an interface by which the processing circuitry issues a memory system request to a memory system, wherein the extension task offload interface is responsive to at least one task offloading instruction decoded by the decoding circuitry to offload the low-precision computation extension task to the extension processing circuitry.

2. The apparatus according to clause 1, in which, for at least one variant of the low-precision computation extension task supported by the extension processing circuitry, the low-precision computation extension task comprises a dot product operation to determine a sum of products of respective pairs of elements from first and second sets of data elements, at least one of the first and second sets of data elements comprising the low-precision data.

3. The apparatus according to any of clauses 1 and 2, in which, for at least one variant of the low-precision computation extension task supported by the extension processing circuitry, the low-precision computation extension task comprises an outer product operation to determine a two-dimensional array of result elements from first and second sets of data elements comprising the low-precision data, each result element depending on a product of a respective pair of elements selected from the first and second sets of data elements.

4. The apparatus according to any of clauses 1 to 3, in which a maximum precision supported for a given arithmetic operation by the extension processing circuitry is less precise than a maximum precision supported for the given arithmetic operation performed by the processing circuitry.

5. The apparatus according to any preceding clause, in which the low-precision computation extension task comprises unpacking a packed set of data elements represented in the low-precision number format, to generate an unpacked set of data elements.

6. The apparatus according to any preceding clause, in which the low-precision computation extension task comprises a scaling operation comprising scaling, based on a scaling factor, at least one value dependent on said at least one set of data elements represented in the low-precision number format, to generate at least one scaled value.

7. The apparatus according to any preceding clause, in which the low-precision computation extension task comprises a format conversion operation to generate at least one converted value by converting, to a higher-precision number format having higher precision than said low-precision number format, at least one value dependent on said at least one set of data elements represented in the low-precision number format.

8. The apparatus according to clause 7, in which the higher-precision number format comprises one of:
the single-precision floating-point format;
half-precision floating-point format;
bfloat16 floating-point format; and
a 16-bit integer format.

9. The apparatus according to any of clauses 7 and 8, in which the low-precision computation extension task comprises writing the at least one converted value to a storage location accessible to the processing circuitry.

10. The apparatus according to any of clauses 7 to 9, in which the low-precision computation extension task excludes any further higher-precision computation performed on the at least one converted value.

11. The apparatus according to any of clauses 7 and 8, in which the low-precision computation extension task comprises performing a higher-precision computation operation on the at least one converted value represented in the higher-precision number format, to generate at least one result value to be written to a storage location accessible to the processing circuitry.

12. The apparatus according to any preceding clause, in which the low-precision number format has a precision less than or equal to 8 bits.

13. The apparatus according to any preceding clause, in which the extension processing circuitry is configured to pipeline processing of respective groups of sets of data elements when performing the low-precision computation extension task.

14. The apparatus according to any preceding clause, in which, when the low-precision computation extension task is accepted by the extension processing circuitry, the processing circuitry is configured to commit said at least one task offloading instruction without waiting for completion of the low-precision computation extension task by the extension processing circuitry.

15. The apparatus according to any preceding clause, in which the processing circuitry is configured to obtain a result of the low-precision computation extension task in response to the decoding circuitry decoding at least one extension task result obtaining instruction separate from the at least one task offloading instruction.

16. The apparatus according to any preceding clause, in which, in response to an extension task result synchronisation instruction specifying at least one destination register and an extension task identifier indicative of a specific instance of an extension task offloaded to the extension processing circuitry, the processing circuitry is configured to assign to the at least one destination register result information obtained from the extension processing circuitry by processing the extension task identified by the extension task identifier.

17. The apparatus according to any preceding clause, in which the processing circuitry is configured to continue processing of other instructions while the low-precision computation extension task is performed by, or pending at, the extension processing circuitry.

18. The apparatus according to any preceding clause, comprising a central processing unit (CPU) comprising the decoding circuitry, the processing circuitry, the extension processing circuitry and the extension task offload interface.

19. The apparatus according to any preceding clause, in which the decoding circuitry comprises shared decoding circuitry configured to decode arithmetic/logical instructions, branch instructions and load/store instructions of an instruction set architecture supported by the decoding circuitry and the processing circuitry, as well as being configured to decode the at least one task offloading instruction.

20. The apparatus according to any preceding clause, in which during offloading of the low-precision computation extension task to the extension processing circuitry, the extension processing circuitry is configured to directly access state in architectural registers defined by an instruction set architecture supported by the decoding circuitry and the processing circuitry.

21. The apparatus according to any preceding clause, in which the processing circuitry and the extension processing circuitry share a private cache private to a processing element comprising the processing circuitry and the extension processing circuitry and inaccessible to any other processing element of the apparatus.

22. The apparatus according to any preceding clause, in which the processing circuitry and the extension processing circuitry share translation table walk circuitry configured to control translation table walk operations for obtaining translation table data from a memory system.

23. A system comprising:

the apparatus of any preceding clause, implemented in at least one packaged chip;

at least one system component; and a board, wherein the at least one packaged chip and the at least one system component are assembled on the board.

24. A chip-containing product comprising the system of clause 23, wherein the system is assembled on a further board with at least one other product component.

25. Computer-readable code for fabrication of an apparatus according to any of clauses 1 to 22.

26. A computer-readable storage medium storing the computer-readable code of clause 25.

27. A computer program comprising instructions which, when executed by a host data processing apparatus, control the host data processing apparatus to provide an instruction execution environment for execution of target program code, the computer program comprising:

decoding program logic configured to decode instructions of the target program code;

processing program logic configured to control the host data processing apparatus to perform data processing operations in response to the instructions decoded by the decoding program logic; and extension processing program logic configured to simulate offloading, in response to at least one task offloading instruction decoded by the decoding program logic, a low-precision computation extension task to simulated asynchronous extension processing circuitry simulated as being accessible via an extension task offload interface separate from a simulated memory system access interface, the low-precision computation extension task comprising processing one or more sets of data elements for which at least one of the sets of data elements comprises low-precision data represented in a low-precision number format with lower precision than a single-precision floating-point format.

28. A computer-readable storage medium storing the computer program of clause 27.

29. A method comprising:

decoding instructions using decoding circuitry; and in response to the decoded instructions, performing data processing operations using processing circuitry;

wherein the method comprises:

in response to at least one task offloading instruction, offloading a low-precision computation extension task via an extension task offload interface to extension processing circuitry, where the extension task offload interface is separate from an interface by which the processing circuitry issues a memory system request to a memory system; and performing, using the extension processing circuitry, the low-precision computation extension task asynchronously with respect to other data processing operations performed by the processing circuitry, the low-precision computation extension task comprising processing one or more sets of data elements for which at least one of the sets of data elements comprises low-precision data represented in a low-precision number format with lower precision than a single-precision floating-point format.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

decoding circuitry configured to decode instructions;

processing circuitry configured to perform data processing operations in response to the instructions decoded by the decoding circuitry;

extension processing circuitry configured to perform a low-precision computation extension task asynchronously with respect to other data processing operations performed by the processing circuitry, the low-precision computation extension task comprising processing one or more sets of data elements for which at least one of the sets of data elements comprises low-precision data represented in a low-precision number format with lower precision than a single-precision floating-point format; and an extension task offload interface separate from an interface by which the processing circuitry issues a memory system request to a memory system, wherein the extension task offload interface is responsive to at least one task offloading instruction decoded by the decoding circuitry to offload the low-precision computation extension task to the extension processing circuitry.

2. The apparatus according to claim 1, in which, for at least one variant of the low-precision computation extension task supported by the extension processing circuitry, the low-precision computation extension task comprises a dot product operation to determine a sum of products of respective pairs of elements from first and second sets of data elements, at least one of the first and second sets of data elements comprising the low-precision data.

3. The apparatus according to claim 1, in which, for at least one variant of the low-precision computation extension task supported by the extension processing circuitry, the low-precision computation extension task comprises an outer product operation to determine a two-dimensional array of result elements from first and second sets of data elements comprising the low-precision data, each result element depending on a product of a respective pair of elements selected from the first and second sets of data elements.

4. The apparatus according to claim 1, in which a maximum precision supported for a given arithmetic operation by the extension processing circuitry is less precise than a maximum precision supported for the given arithmetic operation performed by the processing circuitry.

5. The apparatus according to claim 1, in which the low-precision computation extension task comprises unpacking a packed set of data elements represented in the low-precision number format, to generate an unpacked set of data elements.

6. The apparatus according to claim 1, in which the low-precision computation extension task comprises a scaling operation comprising scaling, based on a scaling factor, at least one value dependent on said at least one set of data elements represented in the low-precision number format, to generate at least one scaled value.

7. The apparatus according to claim 1, in which the low-precision computation extension task comprises a format conversion operation to generate at least one converted value by converting, to a higher-precision number format having higher precision than said low-precision number format, at least one value dependent on said at least one set of data elements represented in the low-precision number format.

8. The apparatus according to claim 7, in which the low-precision computation extension task comprises writing the at least one converted value to a storage location accessible to the processing circuitry.

9. The apparatus according to claim 7, in which the low-precision computation extension task excludes any further higher-precision computation performed on the at least one converted value.

10. The apparatus according to claim 7, in which the low-precision computation extension task comprises performing a higher-precision computation operation on the at least one converted value represented in the higher-precision number format, to generate at least one result value to be written to a storage location accessible to the processing circuitry.

11. The apparatus according to claim 1, in which the low-precision number format has a precision less than or equal to 8 bits.

12. The apparatus according to claim 1, in which the extension processing circuitry is configured to pipeline processing of respective groups of sets of data elements when performing the low-precision computation extension task.

13. The apparatus according to claim 1, in which, when the low-precision computation extension task is accepted by the extension processing circuitry, the processing circuitry is configured to commit said at least one task offloading instruction without waiting for completion of the low-precision computation extension task by the extension processing circuitry.

14. The apparatus according to claim 1, in which the processing circuitry is configured to obtain a result of the low-precision computation extension task in response to the decoding circuitry decoding at least one extension task result obtaining instruction separate from the at least one task offloading instruction.

15. The apparatus according to claim 1, in which during offloading of the low-precision computation extension task to the extension processing circuitry, the extension processing circuitry is configured to directly access state in architectural registers defined by an instruction set architecture supported by the decoding circuitry and the processing circuitry.

16. A system comprising:
the apparatus of claim 1, implemented in at least one packaged chip;
at least one system component; and
a board,
wherein the at least one packaged chip and the at least one system component are assembled on the board.

17. A chip-containing product comprising the system of claim 16, wherein the system is assembled on a further board with at least one other product component.

18. A non-transitory computer-readable medium storing computer-readable code for fabrication of an apparatus according to claim 1.

19. A non-transitory computer-readable medium storing a computer program comprising instructions which, when executed by a host data processing apparatus, control the host data processing apparatus to provide an instruction execution environment for execution of target program code, the computer program comprising:
decoding program logic configured to decode instructions of the target program code;
processing program logic configured to control the host data processing apparatus to perform data processing operations in response to the instructions decoded by the decoding program logic; and
extension processing program logic configured to simulate offloading, in response to at least one task offloading instruction decoded by the decoding program logic, a low-precision computation extension task to simulated asynchronous extension processing circuitry simulated as being accessible via an extension task offload interface separate from a simulated memory system access interface,
the low-precision computation extension task comprising processing one or more sets of data elements for which at least one of the sets of data elements comprises low-precision data represented in a low-precision number format with lower precision than a single-precision floating-point format.

20. A method comprising:
decoding instructions using decoding circuitry; and
in response to the decoded instructions, performing data processing operations using processing circuitry;
wherein the method comprises:
in response to at least one task offloading instruction, offloading a low-precision computation extension task via an extension task offload interface to extension processing circuitry, where the extension task offload interface is separate from an interface by which the processing circuitry issues a memory system request to a memory system; and
performing, using the extension processing circuitry, the low-precision computation extension task asynchronously with respect to other data processing operations performed by the processing circuitry, the low-precision computation extension task comprising processing one or more sets of data elements for which at least one of the sets of data elements comprises low-precision data represented in a low-precision number format with lower precision than a single-precision floating-point format.

* * * * *